United States Patent [19]

Wrabetz et al.

[11] Patent Number: 5,442,791
[45] Date of Patent: Aug. 15, 1995

[54] INTEGRATED REMOTE EXECUTION SYSTEM FOR A HETEROGENOUS COMPUTER NETWORK ENVIRONMENT

[75] Inventors: Joan M. Wrabetz, New Hope; D. Dean Mason, Jr., Minnetonka; Mark P. Gooderum, Bloomington, all of Minn.

[73] Assignee: Aggregate Computing, Inc., Minneapolis, Minn.

[21] Appl. No.: 242,141

[22] Filed: May 12, 1994

Related U.S. Application Data

[63] Continuation of Ser. No. 861,271, Mar. 31, 1992, abandoned.

[51] Int. Cl.[6] .................. G06F 9/44; G06F 13/14; G06F 15/16
[52] U.S. Cl. ......................... 395/650; 395/700; 395/200.06; 395/200.1; 395/200.15; 364/280.6; 364/280.9; 364/284.4
[58] Field of Search .................. 395/200, 650, 700

[56] References Cited

U.S. PATENT DOCUMENTS

| | | | |
|---|---|---|---|
| 4,951,192 | 8/1990 | Chase, Jr. et al. | 395/700 |
| 5,031,089 | 7/1991 | Liu et al. | 395/725 |
| 5,126,932 | 6/1992 | Wolfson et al. | 364/468 |
| 5,218,699 | 6/1993 | Brandle et al. | 395/650 |

OTHER PUBLICATIONS

Sun Microsystems, Sun OS Reference Manual, Part No. 800-3827-10, Revision A of 27 Mar., 1990.
Stevens, W. Richard, *UNIX Network Programming*, Chapters 1 and 4, pp. 1-9 and 171-196.
Sun Microsystems, *Network Programming Guide*, Part No.: 800-3850-10, Revision A of 27 Mar., 1990.
Schantz, Richard E., Thomas, Robert H. and Bono, Girome, The Architecture of the Cronus Distributed Operating System, IEEE 1986; pp. 250-159.
Walker, Bruce, Popek, Gerald, English, Robert, Kline, Charles and Thiel[2], Greg, The LOCUS Distributed Operating System[1], ACM 1983, pp. 49-70.
Accetta, Mike, Baron, Robert, Bolosky, William, Golub, David, Rashid, Richard, Tevanian Avadis and Young, Michael, Mach: A New Kernal Foundation for UNIX Development[1], Computer Science Department, Carnegie Mellon University, pp. 93-112.

(List continued on next page.)

*Primary Examiner*—Kevin A. Kriess
*Assistant Examiner*—John Q. Chavis
*Attorney, Agent, or Firm*—Patterson & Keough

[57] ABSTRACT

An integrated remote execution system manages resources and provides for the distributed and remote execution of remote requests to those resources in a heterogenous computer network environment that has a plurality of resources loosely coupled to each other. The resources include at least two or more computer processors executing different operating system programs and any memory devices and subordinate programs operating together with the computer processors. Three major components are integrated into a single system by providing for a common remote execution interface that is incorporated into the requesting application program to provide a single programming interface for making remote requests to the system, a separate resource management component to provide information about the various resources in the network, and a remote service routine that can be executed on any of the computer processors selected perform the remote request. The remote execution interface can have the user to determine the selection of which resources to use, or it can automatically make the selection of which resources to use. The resource management component utilizes a hybrid model for managing resources in the network that includes a resource information database that is publish-based and a query module that is query-based. The remote service routine receives the remote requests from the remote execution interface which initiated the remote request and forks a separate remote execution control process for each remote request that actually initiates and performs the remote service in response to the remote request.

38 Claims, 10 Drawing Sheets

OTHER PUBLICATIONS

Shoch, John F. and Hupp, Jon A., The "Worm" Programs—Early Experience with a Distributed Computation, Computing Practices, Mar. 1982, vol. 25, No. 3, pp. 172–180.

Stumm, Michael, The Design and Implementation of Decentralized Scheduling Facility for a Workstation Cluster, IEEE 1988, pp. 12–22.

Nichols, David A., Using Idle Workstations in a Shared Computing Environment, ACM, 1987, pp. 5–12.

Davis, Michael, Schreier, Louis, Wrabetz, Joan, A Processing Architecture for Survivable Command, Control and Communications, IEEE 1987, pp. 639–647.

Oram, Andrew and Talbott, Steve, Managing Projects with Make, Table of Contents.

UNIX Programmer's Manual, Supplementary Documents, Table of Contents.

Kong, Mike, Dineen, Terence H., Leach, Paul, J., Martin, Elizabeth A., Mishkin, Nathaniel W., Pato, Joseph N. and Wyant, Geoffrey L., Network Computing System Reference Manual, Table of Contents.

Hewlett Packard Corp., "Task Broker for Networked Environments Based on the UNIX Operating System", Product Brochure, May 1990.

HOMOGENOUS NETWORK

HETEROGENOUS NETWORK

Fig. 5a zone name: (*Italy*) ⎫ 60 zone users: (*beth, dean, greg, steve, . . .*)

zone hosts: (*venice, sicily, padua, rome . . .*)

Fig. 5b resource identifier: (*UNIX_HOST*)

location: (*padua*) ⎫ 62 owner: (*dean*)

last update: (*Jan. 20, 1992 12:53:47*)

property list: (*UNIX_HOST:NAME, UNIX_HOST:LOAD_AVE, UNIX_HOST:SWAP, UNIX_HOST:IDLE_TIME, . . .*)

subordinate resource list: (*SOFTWARE_LICENSE, SOLID_STATE_DISK, HARDWARE_CARD, . . .*)

Fig. 5c property identifier: (*UNIX_HOST:NAME*) ⎫ 64 type: (*CHAR\**)

value: (*padua*)

last update: (*Jan. 20, 1992 12:53:47*)

resource identifier: *(UNIX_HOST)* ⎯32 requesting user: *(dean)* constraint: *(UNIX_HOST:LOAD_AVE < 1.0)* order by: *(UNIX_HOST:IDLE_TIME)*

INTEGRATED REMOTE EXECUTION SYSTEM FOR A HETEROGENOUS COMPUTER NETWORK ENVIRONMENT

This application is a continuation of application Ser. No. 07/861,271, now abandoned, filed Mar. 31, 1992.

TECHNICAL FIELD

The present invention relates generally to networked computer processing systems and, more particularly, to an integrated remote execution system for managing resources and remote requests for those resources in a heterogenous computer network environment, and for providing for the distributed and remote execution of tasks in a heterogenous computer network environment.

PRIOR ART

Networked computer processing systems allow several processors or workstations to communicate with each other in a loosely coupled environment where the processors generally do not share a common memory. For a general background on networked computer processing systems, reference is made to Stevens, W., Unix ® Network Programming, Prentice Hall (1990), Chpts 1 and 4, pgs. 1–10 and 171–196.

The first network environments only allowed for the sharing of information or files among processors in the network. As network environments became more popular due to the decreased cost and increased performance of personal computers and workstations, a need to take advantage of the potential for parallel and distributed processing of programs on the network was recognized. The first response to this need was the development of a remote execution capability as part of a common operating system program that was running on all of the computers in the network. This type of remote execution service, known as kernel-level remote execution service, allowed for the remote instantiation, invocation and termination of an entire process under the direct control of an application program using various internal operating system routines. Examples of kernel-level remote execution services in the prior art include: Walker, B., Popek, G., English, E., Kline, C., Theil, A., "The Locus Distributed Operating System", *Proc. of the 9th ACM Symposium on Operating System Principles*, Dec. 1983, pgs. 49–70. Schantz, R., Thomas, R., and Bono, G., "The Architecture of the Cronus Distributed Operating System", *Proc. of the 6th Int'l Conf. on Distributed Operating Systems*, May, 1986, pgs. 250–259. Acetta, M., Baron, R., Bolosky, W., Golub, D., Rashid, R., Tevanian, A., and Young, M., "MACH: A New Kernal Foundation for UNIX Development", *Proc. USENIX 1986 Summer Tech. Conf. and Exhibition*, June, 1986, pgs. 93–112.

Although the various types of kernel-level of remote execution services fulfilled the need for remote execution of processes in a network, they were necessarily restricted to a network environment where all of the computer processors were executing an identical operating system program. As network environments became larger and more complicated, it became apparent that there was also a need to provide for remote execution capabilities in a network environment where not all of the processors were the same and where the processors were not executing the exact same operating system program. For purposes of the present invention, a network environment where all of the processors connected to the network are executing identical operating system programs will be referred to as a homogenous network environment. In contrast, a network environment where different processors are executing different operating system programs, or even different versions of the same operating system program, will be referred to as a heterogenous network environment. Because the operating system programs in a heterogenous network environment are necessarily different, a heterogenous network environment cannot use the same type of kernel-level solution for establishing a remote execution service in a heterogenous network as was used to establish a remote execution service in a homogenous network.

In response to the need for remote execution services in a heterogenous network environment, two different types of services have been developed: application-level remote execution services and remote procedure call services. Application-level remote execution services operate above the operating system and, therefore, do not need to modify any internal operating system routines in order to implement the remote execution of processes, including all of the steps of instantiating, executing, and finally terminating those processes. Examples of application-level remote execution services include: Shoch, J., and Hupp, J., "The 'Worm' Programs—Early Experience with a Distributed Computation", *Comm. of the ACM*, Vol. 25, No. 3, March, 1982, pgs. 172–180; Nichols, D., "Using Idle Workstations in a Shared Computing Environment", *Comm. of the ACM*, Vol. 11, No. 5, May, 1987, pgs. 5–12; Hewlett Packard Corp., "Task Broker for Networked Environments based on the Unix ® Operating System", Product Brochure, May, 1990, the BSD rsh command *Unix Programmer's Manual*, 4.2 BSD Virtual VAX-II Version, March, 1984, and the Sun rex command Sun Microsystems, Inc., *Sun OS Reference Manual*, Part No. 800-3827-b, March, 1990, pg. 2064. In contrast, the remote procedure call service, or rpc facility, only allows for the remote execution of certain specially designed procedures that have previously been instantiated on a remote processor in the network. Examples of rpc facilities include: the Sun rpc command Sun Microsystems, Inc., *NetWork Programming Guide*, Part No. 800-3850-10, March, 1990. Chpts. 2–7 and the NCS rpc command Kong, M., Dineen, T., Leach, P., Martin, E., Mishkin, N., Pato, J., and Wyant, G., *Network Computing Systems Reference Manual*, Prentice Hall, Englewood Cliffs, N.J. (1990).

The primary differences between an application-level remote execution service and an rpc facility are found in the ways in which the execution of remote tasks are managed, especially the kinds of tasks which can be remotely executed and the degree to which each service is or is not tailored specifically for remote invocation. Basically, the rpc facility is easy to use in terms of invoking the remote execution of a task; however, much of the flexibility in terms of what type of tasks can be performed by the rpc facility is sacrificed in order to make the rpc facility easy to use. Each rpc procedure is generally a relatively short or standardized procedure, that is specially coded to allow for the remote invocation of that procedure on other processors on the network. The rpc procedures cannot be remotely instantiated or terminated as only the processor on which the procedure was to be executed can perform the steps for installing or instantiating the rpc procedure, as well as the steps for terminating that procedure. As a result, the rpc facility is generally limited to providing those types of standardized procedures that would be invoked by many different users on the network as one part of an entire process being executed by those users. Unlike the rpc facility, a remote execution service can operate on potentially any type of process, rather than just a specially designed rpc procedure. Unfortunately, present remote execution services are difficult to use, and there is no standardization of usage from one application program to another. Thus, although the marketplace for distributed applications is maturing to the point where there are a growing number of applications that could take advantage of the distributed processing capabilities of a heterogenous computer network, there presently are no distributed computing tools that can easily and intelligently implement a seamless and transparent remote execution service in a heterogenous computer network environment.

Although prior art remote execution services have operated somewhat effectively in a homogenous network environment, they have been difficult to implement effectively in a heterogeneous network environment. Among the problems which make remote execution difficult in a heterogenous network environment are the fact that the prior art systems are not location transparent and do not support a high level of operating system semantics. Location transparency refers to whether a requestor must know the location or identity of the remote resource being accessed. Unlike prior art homogenous networks, prior art remote execution services for heterogeneous network environments have required the requestor to know the location (e.g., network identification) of the resource being requested. This requirement imposes additional burdens on a user trying to execute a request for a remote resource. For example, in most prior art heterogenous networks, the requestor is assigned a specific remote resource in the form of an idle processor in the network; however, if a local user logs onto this idle processor, the remote execution request may be automatically killed, and it is then up to the requestor to find another idle processor and start the remote execution request all over again. Prior art remote execution services for heterogenous networks also lack the ability to support operating system semantics (i.e., the ability to execute some or all of the operating system calls and routines) because such systems must run on more than one type of operating system program. Unlike prior art homogenous networks that make direct use of the operating system program, the inability of a remote execution service in a heterogenous network limits the ability of the remote execution service to monitor and control the remote execution of requests, for example.

As the advantages of parallel processing on a network were being realized, a need was also recognized for managing the various resources within a network in order to increase the utilization of those resources. In response to the need to manage the various resources in the network, a variety of resource managers have been developed for efficiently managing and scheduling the use of the resources by requestors in a network. Examples of such resource managers include: U.S. Pat. Nos. 4,951,192 and 5,031,089; Stumm, M. "The Design and Implementation of a Decentralized Scheduling Facility for a Workstation Cluster", 2nd IEEE Conf. on Computer Workstations, Vol. CH-24, No. 41, pgs. 12–22 (1988); and Davis, M., Schreier, L. and Wrabetz, J., "A Processing Architecture for Survivable Command, Control and Communication", Proceedings of MILCOM 87, Washington, D.C. (1987).

As used within this patent, the term resource refers to any physical or logical entity in the network about which attribute or state information may be collected or stored. Resources would typically include the computer processors connected to the network, and any of the memory devices such as main memory or disk drives of each computer processor, as well as any subordinate software programs that can execute on that computer processor. For example, a resource might be a math co-processor on one of the workstations in the network, a particular software package, or a disk drive capable of storing files of a certain size. The term requestor will be used to refer to any physical or logical entity that is making a request for a resource in the network. Typically, this will be an application program executing on a computer processor on behalf of a user or a system management routine; although a requestor might also be an operating system routine executing on a computer processor, or even a remote procedure call or a daemon or agent process.

Generally, one of two models has been used for prior art resource managers—distributed control vs. centralized control. In a distributed control model, each requestor is provided with the intelligence to select and schedule the resources required by that requestor. In a centralized control model, each requestor submits a request to a central control program which evaluates the requests and assigns resources in the network to satisfy those requests. Within each model, two general paradigms have been used to acquire information about the resources in the network—the publish paradigm vs. the query paradigm. In resource managers that use the publish paradigm, each resource periodically publishes or broadcasts information about that resource to all other requestors in the network; whereas in resource managers that use the query paradigm, each requestor requests information about a resource only at the time that the requestor needs to make use of that resource. Unfortunately, neither of these paradigms provides an adequate solution to all of the problems confronted by a resource manager. While the publish paradigm is more efficient in terms of the amount of time a requestor must spend in order to select a resource because all of the resource information is available locally, the publish paradigm can dramatically increase network traffic and cannot guarantee that the information about a resource is current. In contrast, the query paradigm is less efficient at the time a request is made because each resource must be queried for its current status; however, once obtained, the status information is current and there is less traffic generated on the network.

Resource management is more difficult in a heterogenous network environment because of the lack of standardization of the resources that are available in such a network and because of the lack of an intelligent allocation mechanism. By its nature, a heterogenous network will necessarily have resources with different capabilities and requirements. As a result, additional information about each resource is required in order to determine whether that resource is available to respond to a request. Regardless of which model is used, prior art resource managers generally have a very rudimentary system for acquiring information about resources. In addition, prior art resource managers use one or more types of fixed allocation mechanisms for assigning resources to requests with no ability for individual requestors in such systems to request resources based on an allocation paradigm other than the fixed allocation mechanism. Consequently, the utilization of the resources in a heterogenous network environment is usually an unpredictable function of how well the requests in the system match up with what the fixed allocation mechanism expects those requests to be at any given time.

Even if prior art remote execution services and resource managers could be effectively implemented for a heterogenous network environment, which they have not, a major factor causing the underutilization of computing resources in a heterogenous network is that remote execution services and resource management are treated as separate problems in the prior art. As a result, there is little, if any, coordination and integration between the process of managing the resources in a computer network and the process of implementing the remote execution of requests to those resources. This lack of coordination and integration forces the users to assume almost all of the management and control over decisions regarding management and selection of resources and the use of remote execution services in a heterogenous network environment. This eliminates the opportunity for truly location independent use of resources. It also forces the users to interface with two separate systems in order to make and execute a request for a remote resource. The result is that unsophisticated users cannot access the entire resource power of the network without understanding both the concepts of networking and distributed execution on remote resources and the myriad of different tools needed to find and use those resources. Even when a user can navigate through the maze required to find and use a remote resource, it is not uncommon for the computer overhead associated with a remote request to take anywhere between several seconds to a minute or more of computer time. The magnitude of this computer overhead limits the ability of a requestor to make a remote request if the request does not involve a large task that can effectively offset the time lost due to the computer overhead. In other words, if it will take longer for a requestor to set up a remote request than it would for the requestor to execute that request locally, there is no advantage to making the remote request. When the computer overhead associated with making a remote request is combined with the additional programming effort required to understand and implement distributed execution on a heterogenous network, the result is that users do not take full advantage of the potential power of the network and the various resources in the network are significantly underulitized.

Consequently, there is a need for an integrated solution to resource management and remote execution in a heterogenous computer network environment that provides seamless and transparent access to all of the resources in the network in such a way that the user can easily interface with the system and that the overhead associated with making and executing remote requests is decreased. In addition, there is a need for a system for providing remote execution services in a heterogenous computer network environment that can overcome the problems with prior art systems and more closely emulate the features and advantages of remote execution services that are available for homogenous computer network environments. In a heterogenous network environment, it is also imperative to provide a system for managing remote execution services that is able to make individualized and intelligent decisions about dynamically allocating remote resources to requests for remote execution services.

SUMMARY OF INVENTION

The present invention is an integrated remote execution system that manages resources and provides for the distributed and remote execution of requests to those resources in a heterogenous computer network environment. Unlike the prior art, the present invention integrates three major components into a single system by providing for a common remote execution interface that is incorporated into the requesting application program to provide a single location transparent programming interface for making remote requests to the system, a separate resource management component that provides information about the various resources in the network, and a remote service routine that can be executed on any of the computer processors selected to perform the remote request. The remote execution interface can have the user determine the selection of which resources to use, or it can automatically make the selection of which resources to use. The resource management component utilizes a hybrid model for managing resources in the network that includes a resource information database that is publish-based and a resource query module that is query-based. The remote service routine receives the remote requests from the remote execution interface which initiated the remote request and forks a separate remote execution control process for each remote request that actually initiates and performs the remote service in response to the remote request. All three of these components operate together in a heterogenous computer network environment to provide an integrated remote execution system in such a way that the application can easily interface with the system and that the overhead associated with initiating and executing remote requests is decreased by making individualized and intelligent decisions about dynamically allocating remote resources to the requests. In addition, the integrated remote execution system of the present invention provides for features and advantages that were previously only available for remote execution services in homogenous computer network environments.

The common remote execution interface is an application program interface that is operably integrated with a requestor in the network environment for issuing both a resource query and one or more resource requests for each remote request. The resource query includes one or more query parameters specifying a set of resources that can satisfy the resource request. In the preferred embodiment, the query parameters include both a set of resource requirements for the resource request, and a scheduling policy for determining how the list of available resources should be ordered. This allows for individualized and flexible resource querys to be initiated by the remote execution interface so that the list of available resources returned by the system is generated in a manner most helpful to the particular needs of that requestor. The resource request includes any information necessary to instantiate and perform the remote service, such as the parameters needed by the task to be executed. Because the resource query will return a list that can include more than one resource to satisfy the remote request, multiple resource requests can be initiated to one or more of the resources in that list. In this way, a unique resource query is not required for each resource request as the application program or the remote execution interface can reuse the same list for multiple resource requests that require the same type of resources to satisfy the remote request. In addition, if the application program does not specify a complete remote request, or if the user wishes to have the remote request handled automatically by the remote execution interface, the remote execution interface can supply the necessary query parameters for the resource query, along with the information for the resource request to automatically execute the remote services in response to the remote request.

The resource management component is separate from the remote execution interface and operates on a new type of hybrid resource management model that includes a publish-based resource information database and a query-based resource query module. The publish-based resource information database is operably connected to the network environment for storing one or more items of information about the resources in the network environment. One or more agents or daemons operating on at least one of the computer processors periodically collect the items of information about one or more computer processors and any other resources operating together with the computer processors that are available to perform remote execution services and providing the items of information to the database. A resource definition database is also provided such that for each resource one or more property-value pairs may be defined to specify various attributes or characteristics of that resource. By using the resource definition database, the resource information database is extensible and can accommodate any type of user-defined resource, including resource definitions added after the installation of the system on the network. A resource query module is operably associated with the resource information database means for receiving the resource query from the remote execution service interface. The resource query module analyzes the resource information database to determine which of the resources in the network environment match the query parameters and are available to satisfy the resource request, and then returns a list of resources which can be used to satisfy the resource request to the remote execution interface. In the event that a scheduling policy has been provided as part of the resource query, the resource query module will order the available resources as indicated by the scheduling policy prior to returning the list of resources to the remote execution interface. The application program or remote execution interface then selects one or more computer processors to send the resource request for remote execution services based on the list of resources generated by the resource query module.

The remote service routine is instantiated and initiated on each of the computer processors that is selected to perform a remote service in response to a remote request. The remote service routine receives a resource request from the remote execution interface which initiated the remote request and forks a separate remote execution control process for each resource request that actually initiates and performs the remote service in response to the resource request. The use of a separately forked remote execution control process for each the resource requests allows the remote service routine to respond to and initiate control directives, such as signal and wait commands as well as managing multiple remote execution requests at one time. In the preferred embodiment, a separate echo control process can also be forked for each resource request to communicate with the remote execution interface that has sent the resource request in order redirect any input, output and error status of the remote execution service, depending upon the mode in which the remote service will be executing. In the preferred embodiment, three different modes of execution are allowed for the remote service: attached interactive, attached non-interactive and detached. The echo control process is used to perform interactive input/output between the remote service routine and the remote execution interface for those resource requests which are operating in attached interactive mode.

The new type of hybrid resource management model of the present invention combines both the publish paradigm and the query paradigm to allow resource allocation decisions to be made quickly and efficiently based upon the best resource information available. The items of information maintained in the publish-based resource information database are of weak consistency in that it is not necessary for the system to have completely accurate information about each and every resource in the system at every instant of time. Instead, the items of information in the resource information database are updated periodically by the agents as information about the resources changes and as system activity allows, and the rate at which updates will be processed by the agents can depend upon how often information about a resource changes. The use of the publish paradigm for this portion of the hybrid resource management model minimizes the network overhead associated with gathering and updating the resource information database. For example, an agent may publish new status information about a resource only as often as it is reasonable to expect a change in that information, e.g., every five minutes for load average versus every day for the availability of a particular software license. Unlike prior art resource managers that use only the publish paradigm, the present invention utilizes a resource information database that is separate from the individual requestors in the system. This eliminates the need for each requestor to keep a copy of the latest information about all of the resources in the network. The hybrid nature of the resource management model is created by using a query paradigm at the time each resource request is initiated to determine the availability of resources to service that request, in addition to the publish paradigm to initially acquire the information about available resources in the network. Unlike prior art resource management systems that use only the query paradigm, the present invention makes only one resource query to the resource query module associated with the resource information database. This eliminates both the need to know the identity of each and every resource in the network and the need to make a separate (and possibly synchronous) query to each those resources in order to ascertain their present status and availability. In the preferred embodiment, the resource information database is a centralized database, typically located on one or more of the processors in the network that will have sufficient CPU capacity to execute the resource management component in a timely manner. In an alternative embodiment suitable for use with larger networks, the network can be divided into zones and a separate copy of the resource information database can be maintained for the users in that zone.

By establishing a common remote execution interface that is incorporated into each requestor, the present invention eliminates much of the overhead that would normally otherwise have to be programmed into an application program in order to take advantage of the potential for remote execution that is offered by a network environment. Simply by specifying a set of resource parameters, a requestor can identify, organize and then communicate with the available remote resources in order to perform one or more remote services on the network, all through the same interface without the need for additional programming. By utilizing the present invention, a performance increase of up to 10 times the execution speed that would otherwise be observed if a task was executed serially on a single machine has been observed for parallel compilation processes in a heterogenous network having less than twenty workstations. Obviously, the performance increases that may be achieved by utilizing the present invention will vary depending upon the size of the network, the availability of the desired resources and the degree to which parallel execution of a task is possible. However, by significantly lowering the overhead associated with finding available remote resources and then executing remote services on those resources in response to remote requests, and by minimizing the amount of effort required by a user to implement such remote requests, the present invention increases the efficient utilization of all of the resources in a heterogenous computer network environment.

Accordingly, it is a primary objective of the present invention to provide a method and apparatus that can implement an integrated system for resource management and remote execution services in a heterogenous computer network environment.

Another objective of the present invention is to provide seamless and transparent access to all of the resources in the network in such a way that an application can easily interface with the system and that the overhead associated with making and executing remote requests is decreased.

A further objective of the present invention to provide an integrated method and apparatus for providing remote execution services in a heterogenous computer network environment that can overcome the problems with prior art systems and more closely emulate the features and advantages of remote execution services that are available for homogenous computer network environments.

A still further objective of the present invention to provide an integrated system for managing resources in a computer network environment that is able to make individualized and intelligent decisions about dynamically allocating remote resources to requests for remote services in that computer network environment.

Still another objective of the present invention is to provide a common interface for communicating information about resources in a heterogenous network environment that is both uniform and extensible.

These and other objectives of the present invention will become apparent with reference to the drawings, the detailed description of the preferred embodiment and the appended claims.

BRIEF DESCRIPTION OF THE DRAWINGS

FIGS. 5a, 5b, 5c and 5d are pseudo-code representations of the resource information and data structures maintained by the preferred embodiment of the resource information database.

FIGS. 6a and 6b are respectively a schematic block diagram depicting how information about resources is defined in the resource definition database of the preferred embodiment and a sample definition for a host resource.

DETAILED DESCRIPTION OF THE PREFERRED EMBODIMENT

Figure 1:
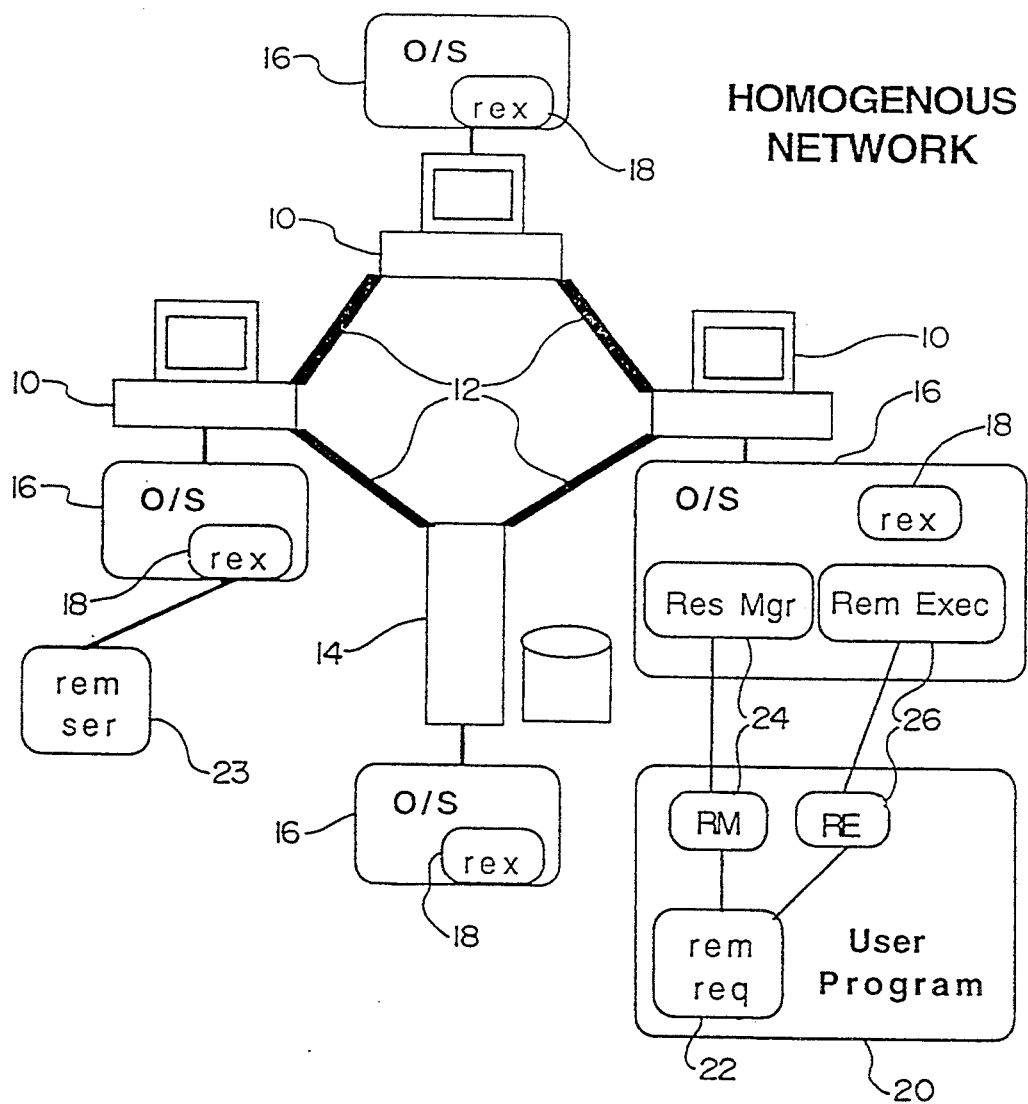
FIG. 1 is block diagram of a typical prior art resource manager and remote execution service in a homogenous computer network environment.
Figure 2:
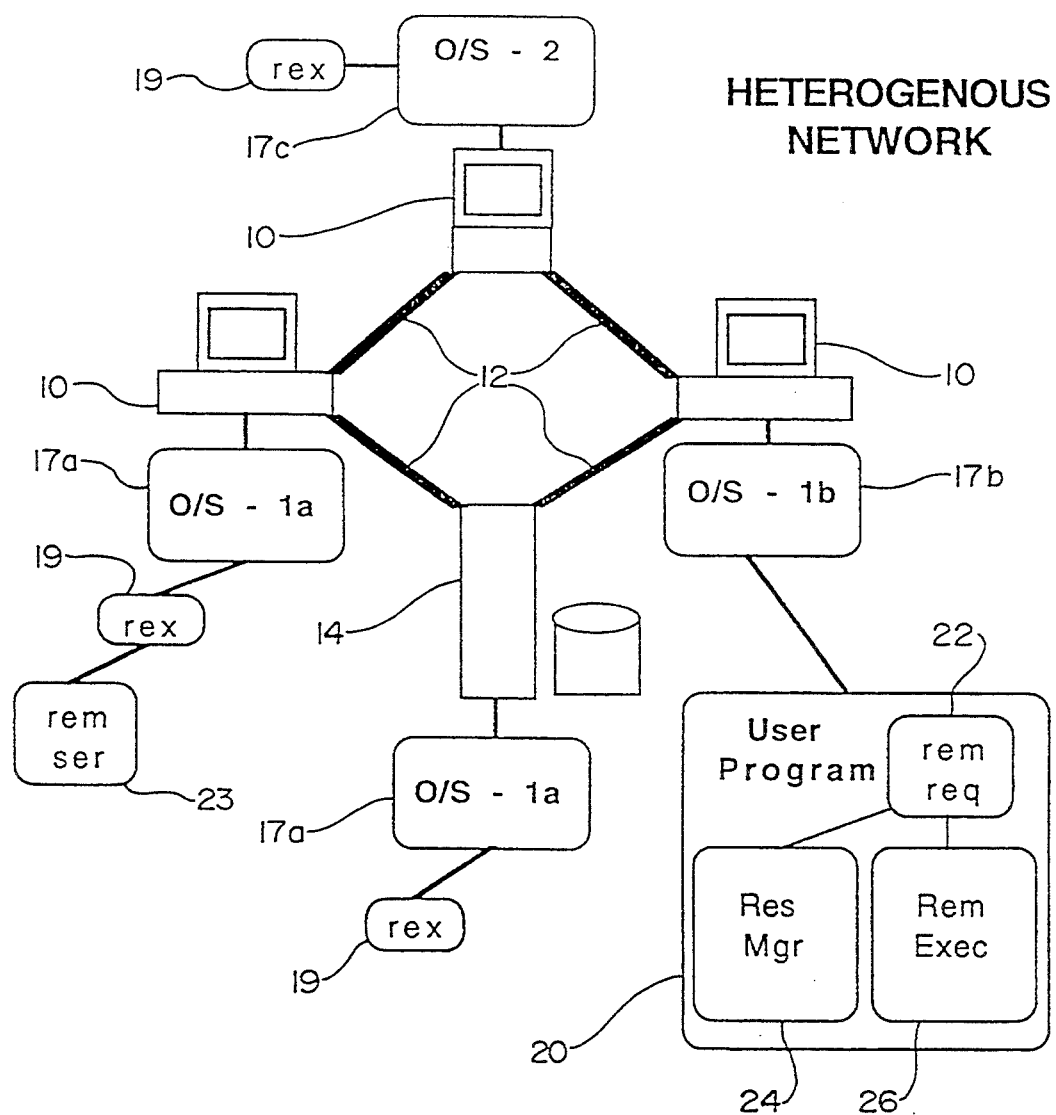
FIG. 2 is block diagram of a typical prior art resource manager and remote execution service in a heterogenous computer network environment.

Typical prior art resource managers and remote execution services for both a homogenous and heterogenous computer network environment are shown in FIGS. 1 and 2, respectively. In both the homogenous network and the heterogenous network, a plurality of workstations 10 are loosely coupled together by a network 12. The workstations 10 are typically computer processors with a user interface, such as a terminal and keyboard. The network 12 may also link together one or more file servers or computer servers 14. Alternatively, the network may include external access to other networks via telecommunication links, or may include access to larger computer systems, such as mainframes or even supercomputers.

It will be recognized that there are many varied ways in which computer processors can be connected together to form a network, and many different types of both physical and logical connections which are required for effective operation of a computer network environment. For a summary description of the open systems interconnection model (OSI) for computer connections and communications in a computer network environment, reference is made to Stevens, W., *Unix ® Network Programming*, Prentice Hall (1990), Chpts 1, pgs. 3–6. It will be understood that the present invention generally operates at the application level of the various levels of computer connections in the OSI model although certain aspects of the present invention provide some of the functions typically found in the presentation and session levels the OSI Model of a network connection.

In the homogenous network shown in FIG. 1, all of the computer processors are executing the same version of the operating system program 16. In addition, all of the identical operating system programs 16 contain an identical remote execution facility, rex 18. By contrast, in the heterogenous network shown in FIG. 2, different computer processors can be executing different versions of the same operating system program 17a or 17b, or even a different operating system program 17c. Because the heterogenous network shown in FIG. 2 cannot have access to the various routines within the operating system, the remote execution facility, rex 19, is separate from the operating system programs 17a, 17b and 17c.

In the prior art, in order to initiate a remote service 23 via a remote request 22, special code in the user program 20 must access both a resource manager 24 and a remote execution service 26. In the homogenous network environment, as shown in FIG. 1, several common operating system routines, such as rex 18, are used by the resource manager 24 to select a remote resource, and by the resource execution service 26 to perform the remote service 23. The use of these routines in the common operating system program 16 minimizes the amount of additional coding in the user program 20, and provides for a relatively high level of standardization because the resource manager 24 and the remote execution service 26 are easily accessed by calls to the operating system. In contrast, in the heterogenous network shown in FIG. 2, significant additional coding in the user program 20 is required to implement the resource manager 24 and the remote execution service 26 because the user program must assume much of the responsibility for each function that is taken care of by the operating system in a homogenous network. Not only must the operation of both resource manager 24 and resource execution service 26 conform to the individual constraints of the various operating system programs 17a, 17b and 17c and to the particular rex 19 which has been implemented for that heterogenous network, there is also generally very little uniformity as to how these routines operate because they usually are individually coded for each user program 20.

Figure 3:
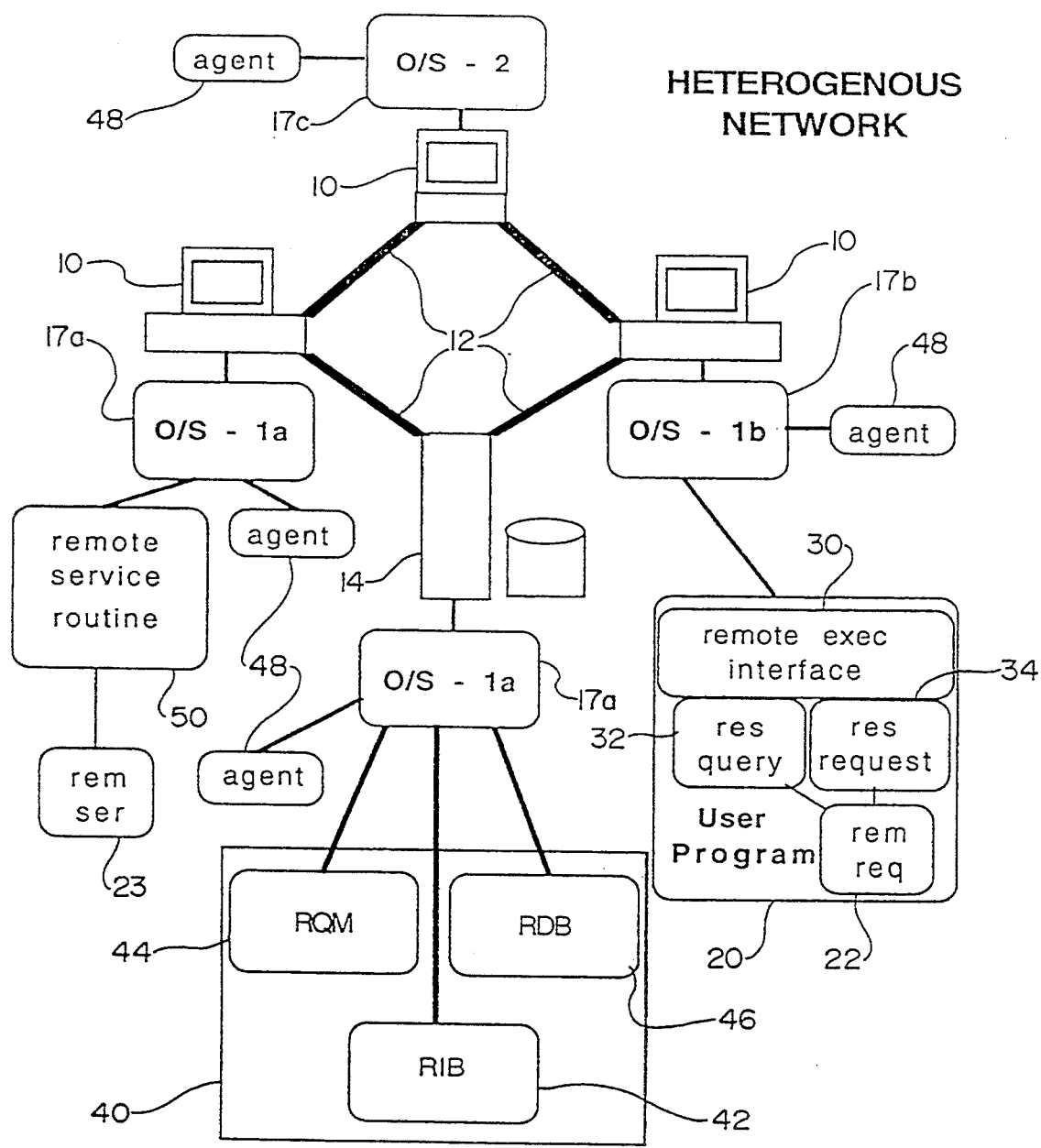
FIG. 3 is block diagram of the integrated system of the present invention for both resource management and remote execution services in a heterogenous computer network environment.

Unlike the prior art heterogenous network shown in FIG. 2, the present invention as shown in FIG. 3 integrates three major components into a single, unified system that manages all of the resources in the network and provides for the distributed and remote execution of requests to those resources. Instead of using an individually coded resource manager 24 and remote execution service 26, a common remote execution interface 30 is incorporated into the user program 20. A separate resource management component 40 includes a publish-based resource information database, RIB 42, and a query-based resource query module, RQM 44. In the preferred embodiment, a resource definition database, RDB 46, stores one or more property-value pairs that define the types of the various attributes and characteristics for each resource. A plurality of agents 48 operate across the network to periodically collect information about the various resources and report that information to the RIB 42. A remote service routine 50 can be instantiated and executed on any of the computer processors available to perform the remote service 23. In the preferred embodiment, communication among all three components is accomplished using the same standards and interfaces as are used by the remote execution interface 30. All three of these components, the remote execution interface 30, the resource management component 40, and the remote service routine 50, operate together in a heterogenous computer network environment to provide distributed remote execution services in such a way as to significantly decrease the overhead associated with initiating and executing remote requests 22, both in terms of programming effort and computer time.

The remote execution interface 30 is operably integrated with a requestor in the network environment as part of the linking stage of the compilation of an application program, for example. When the user program 20 determines that it encounters a need for a remote request 22, all that is necessary to service the remote request 22 is to formulate both a resource query 32 and a resource request 34 for the remote execution service, and process them through calls to the remote execution interface 30. The resource query 32 includes one or more query parameters specifying a set of resources that can satisfy the remote request 22. In the preferred embodiment, the query parameters include both a set of resource requirements for the remote request 22, and a scheduling policy for determining how the list of resources should be ordered. This allows for individualized and flexible resource querys 32 to be initiated by the remote execution interface 30 so that the list of available resource returned by the system is generated in a manner most helpful to the particular needs of that requestor. The resource request 34 includes any information necessary to instantiate and perform the remote service 23. It will be understood that if the user program 20 does not specify a complete remote request 22, or if the user wishes to have the remote request 22 handled automatically by the remote execution interface 30 using certain parameters established by a system administrator, for example, the remote execution interface 30 can supply the necessary default query parameters for the resource query 32, along with the information for the resource request 34 to automatically execute the remote service 23 in response to the remote request 22. In addition to processing the resource query 32 and remote request 34, the remote execution interface 30 also has a variety of operating system-like features that allow the remote execution interface 30 to communicate with the remote service routine 50 in order to initiate and respond to control directive and requests, and perform interactive input/output as discussed in greater detail hereinafter in connection with FIG. 4.

The resource management component 40 is separate from the remote execution interface 30 and operates on a new type of hybrid resource management model that includes a publish-based resource information database, RIB 42, and a query-based resource query module, RQM 44. The publish-based RIB 42 is preferably located on a processor 10 or file server 14 that has sufficient CPU capacity to execute the resource management component 40 in a timely manner. In the preferred embodiment, the resource management component uses an interface 41 that is essentially identical to the remote execution interface 30 as the conduit for transferring information to and from the resource management component 40. One or more agents 48 operating as daemons on at least one of the processors 10 periodically collect the items of information about the resources that are available to perform remote execution services and providing the items of information to the RIB 42 via the interface 41. By using the resource definition database, RDB 46, the RIB 42 is extensible and can accommodate any type of user-defined resource, including resource definitions collected by new agents 48 that are added after the installation of the system onto the network. As such, it will be recognized that more than one agent 48 can be executing on a given processor 10, or, conversely, a single agent 48 can execute on one processor 10, and collect resource information about several processors 10 and the resources associated with those processors. The query-based RQM 44 preferably executes on the same processor 10 or file server 14 that contains the RIB 42. The RQM 44 analyzes the RIB 42 using the property-value pairs as defined in the RDB 46 to determine which of the resources in the network environment match the query parameters in the resource query 42 and are available to satisfy the remote request 22, and returns a list of those resources to the remote execution interface 30. In the preferred embodiment, the RIB 42 is actually distributed on multiple processors 10 with multiple copies of the RIB 42 being maintained on the network 12. In this situation, each RIB 42 uses an internally maintained protocol for distributing information to other copies of the RIB 42 on the network 12 in accordance with any one of a number of well-known distributed database update algorithms. A user program selects a particular RIB 42 on the network 12 to access by having the remote execution interface 30 locate an available RIB 42 among the various copies currently existing on the network 12. This can be done, for example, either by broadcasting a status request to all RIBs 42 and selecting the first RIB 42 to respond, or by all communications to a particular predefined RIB 42 for that processor 10.

Figure 4:
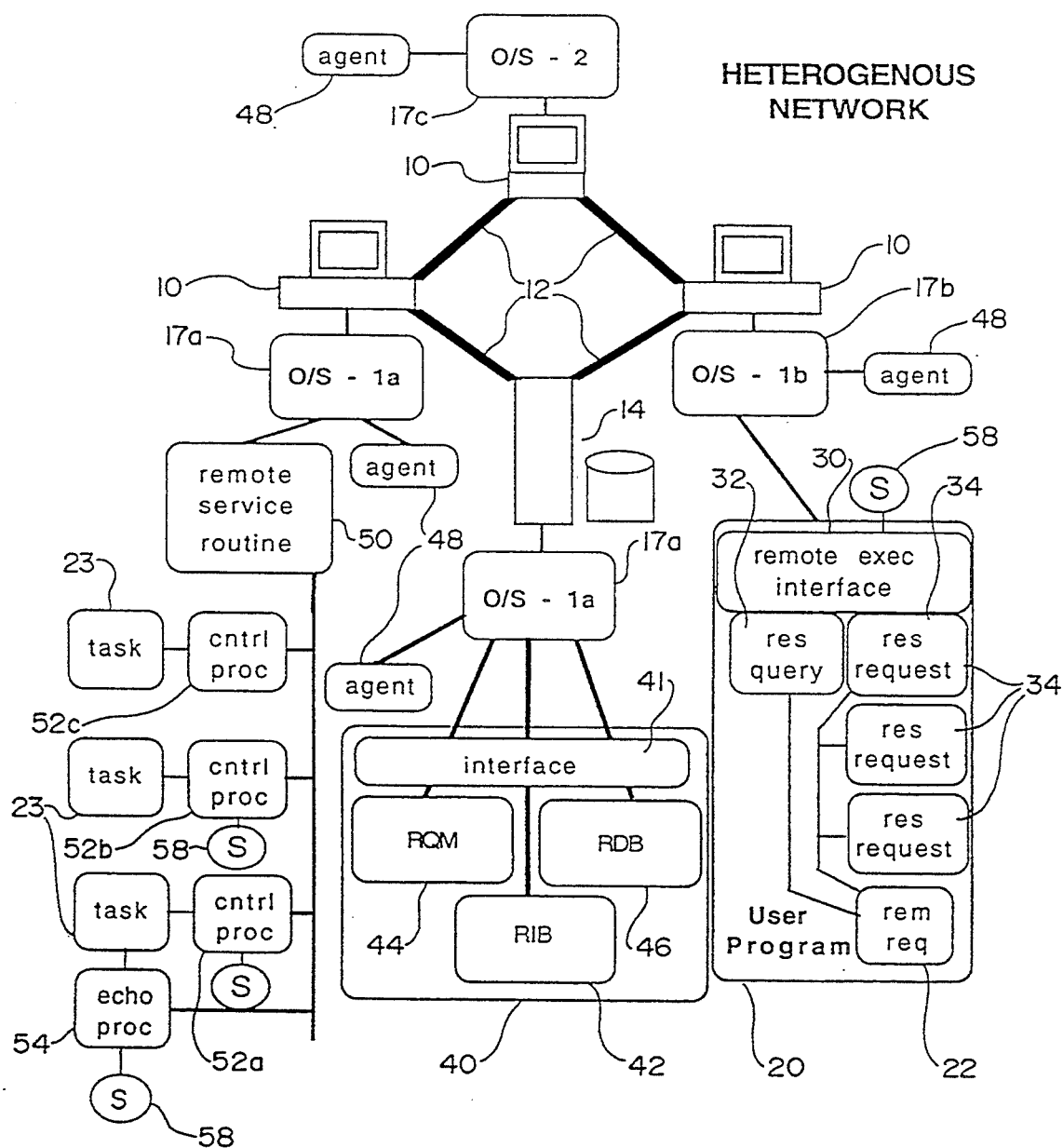
FIG. 4 is more detailed block diagram of the integrated system of FIG. 3 showing the implementation of multiple resource requests and multiple remote services of the preferred embodiment.

Referring now to FIG. 4, the preferred embodiment of the remote service routine 50 will be described showing multiple resource requests 34 and multiple remote services 23, or tasks, being performed in response to those requests. It will be recognized that because the resource query 32 will return a list that can include more than one resource to satisfy the remote request 22, multiple resource requests 34 can be initiated to one or more of the resources in that list. In this way, a unique resource query 32 is not required for each resource request 22 as the user program 20 or the remote execution interface 30 can reuse the same list for multiple resource requests 34 that require the same type of resources to satisfy the remote request 22. The remote service routine 50 receives a resource request 34 from the remote execution interface 30 which initiated the remote request 22 and forks a separate remote execution control process 52 for each resource requests 34 that actually initiates and performs the remote service 23 in response to the resource request 34. The use of a separately forked remote control process 52 for each of the resource request allows the remote service routine 50 to respond to and initiate control directives, such as signal and wait commands. In the preferred embodiment, three different modes of execution are allowed for the remote service: attached interactive, attached non-interactive and detached. These modes are implemented by using three different types of remote control processes 52a, 52b and 52c, respectively. The detached control process 52c does not have the capability of communicating with the remote execution interface 30, other than to return the results of the resource request 34. This type of control process 52c is used for resource requests 34 that can be satisfied without the need to interact with the initiating remote execution interface, such as storing a file on a disk drive, etc. The attached non-interactive control process 52b has the capability of communicating with the remote execution interface using a standard Unix sockets interface, S 58 in order to monitor and control the status of the remote service 23. The attached, non-interactive control process 52b can be used to execute any type of process that may need to interact with the remote execution interface using control directive like signal and wait commands, such as a process for calculating a single value to be returned. For the attached interactive control process 52a, the same sockets interface, S 58, is used, along with a separate echo control process 54 that is also forked for each resource request 34 in order to communicate with the remote execution interface 30 in an interactive mode. The echo control process 54 performs interactive input/output between the remote service 23 and the remote execution interface 30 for those resource requests which are operating in attached interactive mode using a standard Unix ptty echo process. Together, the echo control process 54 and the attached interactive control process 52c can be used to remotely control processes in such a way as to allow the remote service 23 to emulate operation at a local processor.

Figures 5D, 6A:
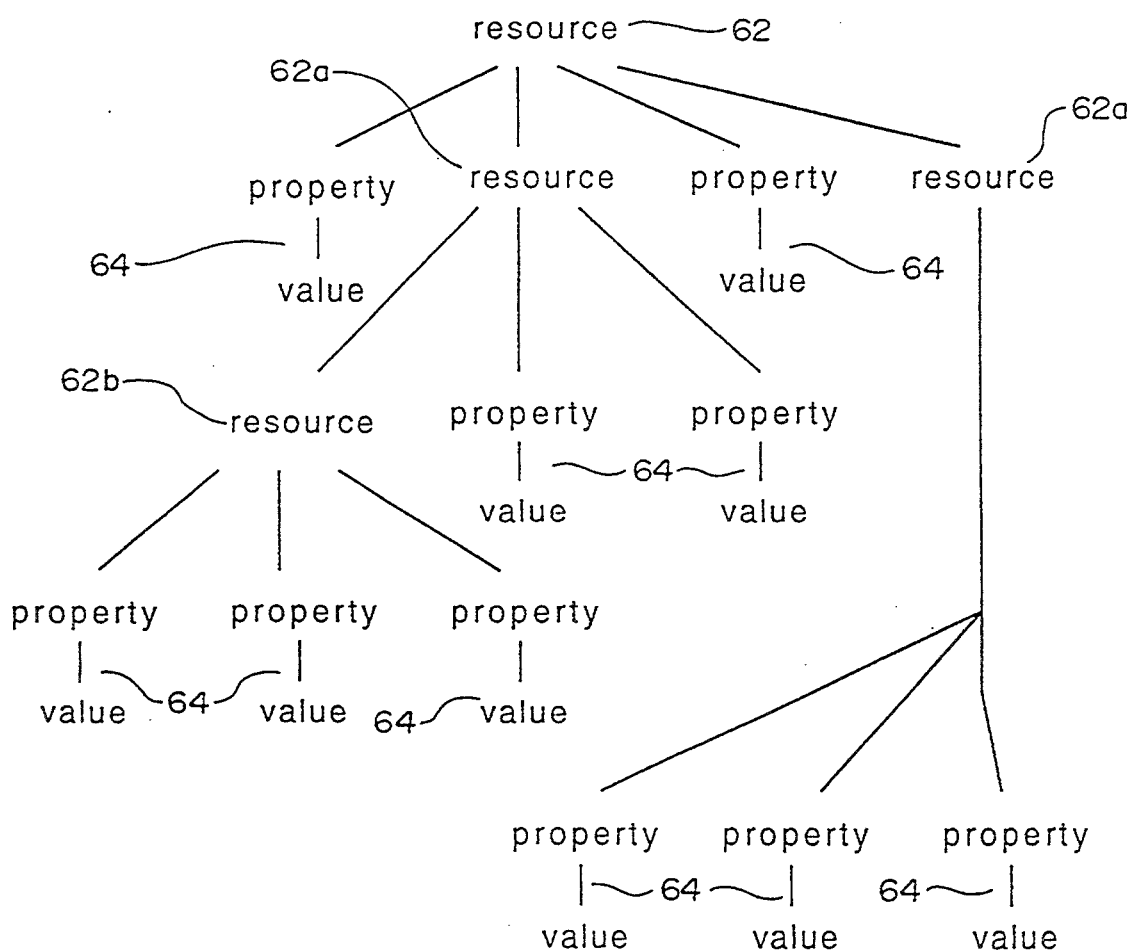

Referring now to FIGS. 5a–5d, some of the various data structure that are used as part of the preferred embodiment of the RIB 42 will be described. In the preferred embodiment, users in the network may be administratively divided into zones for security and access control purposes. FIG. 5a shows the user data structure 60 stored in the RIB 42 for identifying the users and hosts that are associated with a given zone. During the process of responding to a resource query 32, the RQM 44 will check both the zone users and the zone hosts as an initial screening before determining which resources are available to satisfy the resource query 32. FIG. 5b shows the resource data structure 62 stored in the RIB 42 defining each of the resource instances in the network. As previously indicated, a resource can be defined as an empiric representation of any logical or physical entity which resides in the network. FIG. 5c shows the property data structure 64 stored in the RIB 42 defining the property-value pairs for each of the resources in the network. The property value is a strongly typed attribute-value representation of the current state of a particular resource where the attributes are defined in the RDB 46 for that property and the values are collected by the appropriate agent 48 and stored in the RIB 42. Finally, FIG. 5d shows the data structure of a resource query 32 that includes the type of the desired resource, a constraining expression used to filter out resources based upon their current property values, and an ordering expression used to qualify resources based upon their property values.

Figure 6B:
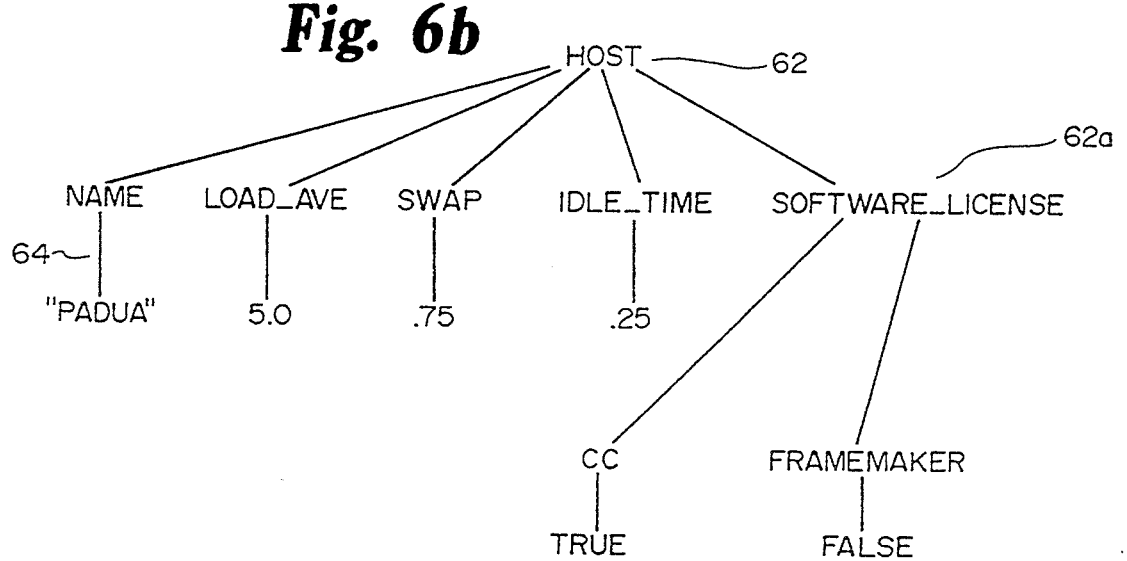

Referring now to FIGS. 6a and 6b, the use of the property-value pairs as defined in the RDB 46 of the preferred embodiment will be described. FIG. 6a shows the definition of a resource 62. Each resource 62 can include definitions for one or more other sub-resources 62a, as well as for one or more property-value pairs 64 for each resource 62, or sub-resource 62a. FIG. 6b shows a sample resource definition for the UNIX-_HOST resource which was defined in the data structure 62 as shown in FIG. 5b.

In the preferred embodiment, the remote execution interface 30, the resource management component 40, and the remote service routine 50 are coded for operation in a Unix ® operating system environment and are capable of running under standard Unix System V, SunOS or BSD versions of the Unix operating system. The hardware platform for the preferred embodiment includes at least five Sun-3, Sun-4 or other SPARC ® workstations, available from Sun Microsystems, Inc., coupled together using an EtherNet ® backbone for the network. Although the preferred embodiment is designed for execution in a Unix environment using workstation-level computer processors, it will be recognized that the present invention is equally applicable in many other types of heterogenous network environments, including, for example, other Unix ®-based platforms, such as Hewlett-Packard ® workstations, DEC ® workstations, IBM ® RS/6000 workstations, or IBM PCs and compatibles, mainframes and supercomputers running Unix ® or System V, as well as non-Unix ® network operating system platforms, such as IBM ® VMS and MVS, or Novell ® NetWare and Microsoft ® LanManager.

In the preferred embodiment, the remote execution interface 30 is maintained as a link library on the network 12 that is integrated with the user program 20 by linking to that library during the compile and link process for the user program 20. Other methods for integrating the remote execution interface 30 as part of the user program 20 could also be used, such as in-lining, pre-linking or other types of system call mechanisms. The transport level interface for the remote execution interface 30 obviously will depend upon the particular transport mechanisms available on the network 12. In the Unix ® network environment, the transport mechanism of the preferred embodiment is Sun rpc running on top of TCP/IP. In an MVS environment, for example, the transport mechanism might be CICS running on top of SNA.

Figure 7A:
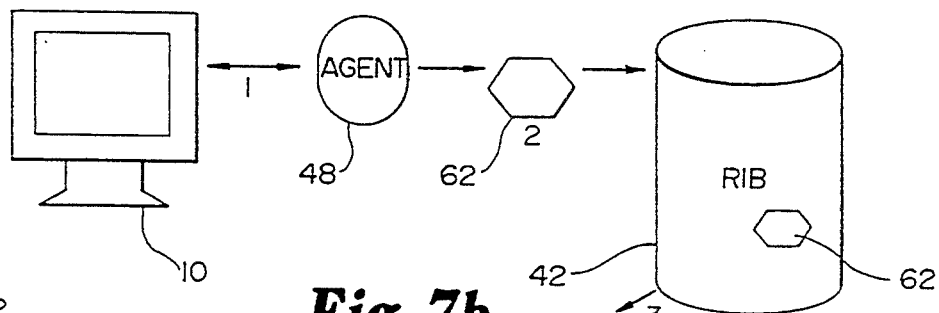
FIGS. 7a and 7b are respectively a schematic block diagram and a flow chart depicting the gathering of information about the various resources in the network using the publish paradigm of the present invention.
Figure 7B:
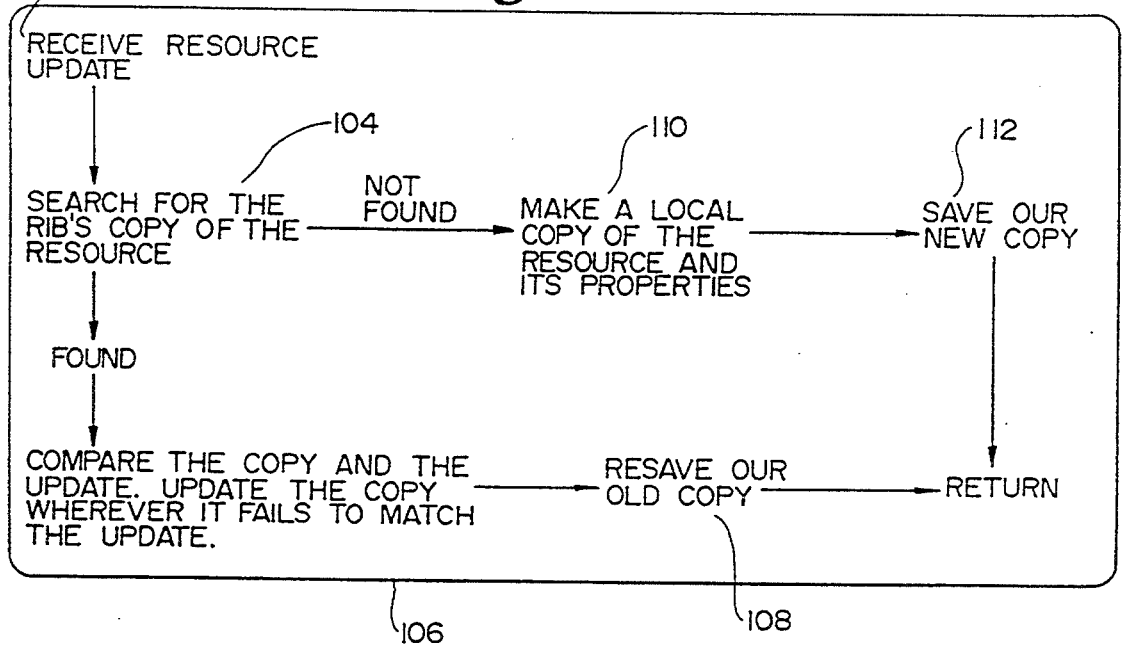

Referring now to FIGS. 7a and 7b, the publish-based process of gathering the items of information about each resource in the network will be described. A daemon in the form of agent 48 executes continually in the background on workstation 10, monitoring and collecting items of state information about one or more predefined resources which reside on workstation 10 or for which the agent 48 is responsible for collecting state information, e.g., state information about a dumb terminal (not shown) that is attached to workstation 10. The information that an agent 48 is to collect will be established at the time that agent is started. Because the agents are localized, it will be recognized that it is possible to shut down and restart agents 48, for example, if additional information is to be collected by an agent 48, just as it is possible to start up new agents without restarting either the processor 10 or the network 12. Periodically, the agent 48 sends one or more resource data structures 62 corresponding to one or more of the resources it is monitoring to the RIB 42 with the latest state information about those resources. The property-value pairs 64 that are maintained in the RIB 42 for each resource 62 are of weak consistency in that it is not necessary for the system to have completely accurate information about that resource at every instant of time. Instead, the property-value pairs 64 are updated periodically by the agents 48 as information about the resources 62 changes and as system activity allows. In essence, the rate at which updates will be processed by the agents 48 can depend upon how often information about a resource 62 changes. For example, a property-value pair 64 for load average of a processor 10 may be updated every few minutes, whereas a property-value pair 64 for license usage may only be updated every hour, or every day. Some property-value pairs 64 may only be updated once at system startup, such as host name.

The actions taken by RIB 42 upon receipt of a resource data structure 62 are shown in FIG. 7b. At Step 102, the RIB 42 receives an update in the form of a resource data structure 62. At Step 104, the RIB 42 determines if the resource is already a part of the database by looking for a resource data structure 62 that defines that resource. If so, the information in the resource data structure 62 in the RIB 42 is compared with the newly received information from the data structure 62, and if different, the newly received data structure 62 is copied into the RIB 42 in place of the old resource data structure 62 at Steps 106 and 108. If not, the resource data structure 62, along with a corresponding property data structure 64, are copied into the RIB 42 and RDB 46 at Steps 110 and 112.

Figure 8A:
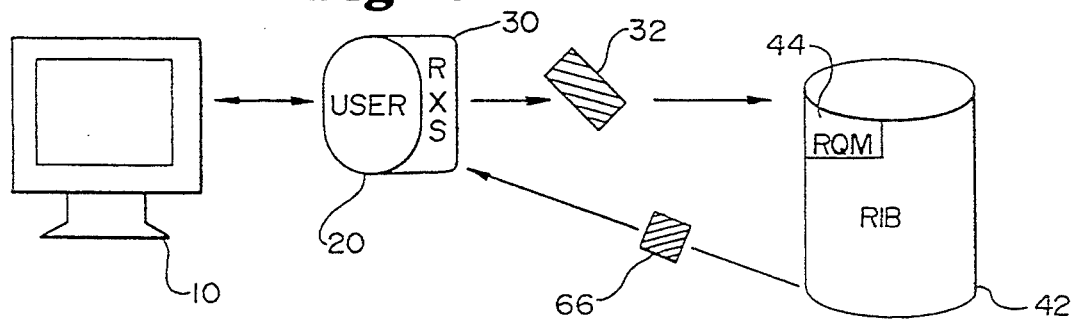
FIGS. 8a and 8b are respectively a schematic block diagram and a flow chart depicting the requesting of information about the various resources in the network using the query paradigm of the present invention.
Figure 8B:
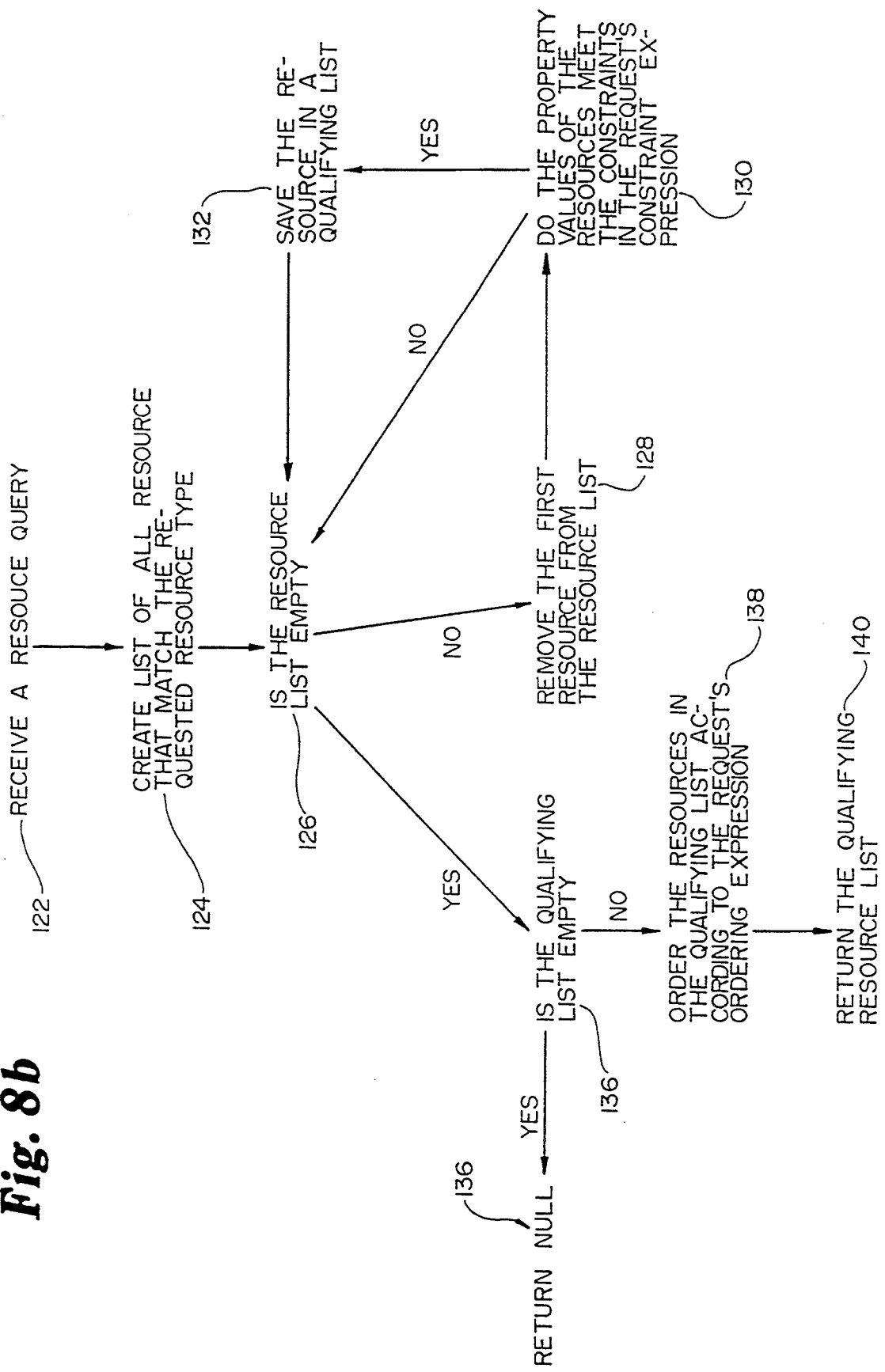

Referring now to FIGS. 8a and 8b, the query-based process of requesting information about the available resources in the network will be described. A user program 20 is executing on workstation 10 and determines a need for a remote request. Using a call to the remote execution interface 30, the user program 20 sends a resource query 32 to the RQM 44. As previously indicated, the resource query 32 identifies the requesting user, the desired resources, constraints which the property values of the resource must match, and an expression to apply to the resource properties so as to order the list of qualifying resources 66 which is to be returned to the user program 20, via the remote execution interface 30. The actions taken by the RQM 44 upon receipt of the resource query 32 are shown in FIG. 8b. At Step 122, the RQM 44 receives the resource query 32. At Step 124, the RQM 44 searches the RIB 42 to create a list of all of the resources that match the requested resource type. At Step 126, a loop is begun to process the resources, if any, which were identified by Step 124. If there are more resources to be processed, the resources are removed from the list one-by-one at Step 128. At Step 130, a check is made to determine whether the resource being processed has property values which meet the constraints in the resource query 32. If not, the resource is discarded and the process goes back to Step 126. If a match is found with the constraints in the resource query 32, the resource is saved in the list of qualifying resources 66 at Step 132 and, again, the process goes back to Step 126. When there are no more resources in the list of resources that match the resource requested, Step 126 transfers control to Step 134 where a check is made to determine whether any resources are in the list of qualifying resources 66. If the list is empty, a null set is returned as the list of qualifying resources 66 at Step 136. If there are qualifying resources, then those resources are ordered according to the expression contained in the resource query at Step 138. Finally, the ordered list of qualifying resources 66 is then returned by RQM 44 to the user program 20 via the remote execution interface 30 at Step 140. To the extent that a resource query 32 is desired that will not return a null set, it will be seen that only those requirements which are absolute should be included as part of the constraints of the resource query 32, whereas those requirements which are merely preferential can be included as part of the scheduling or ordering expression.

There are many potential applications for the distributed use of remote resources of a heterogenous network, such as distributed compilation of large software programs, remote execution for CAD/CAE, financial analysis, chemical analysis, electronic analysis, etc., and even customized distributed applications. By using the remote execution interface 30, the present invention provides a common set of interface standards and tools that can easily be used by application program developers to take advantage of all of the power of the available resources in a network in order to more quickly and efficiently accomplish tasks for end users.

Figure 9:
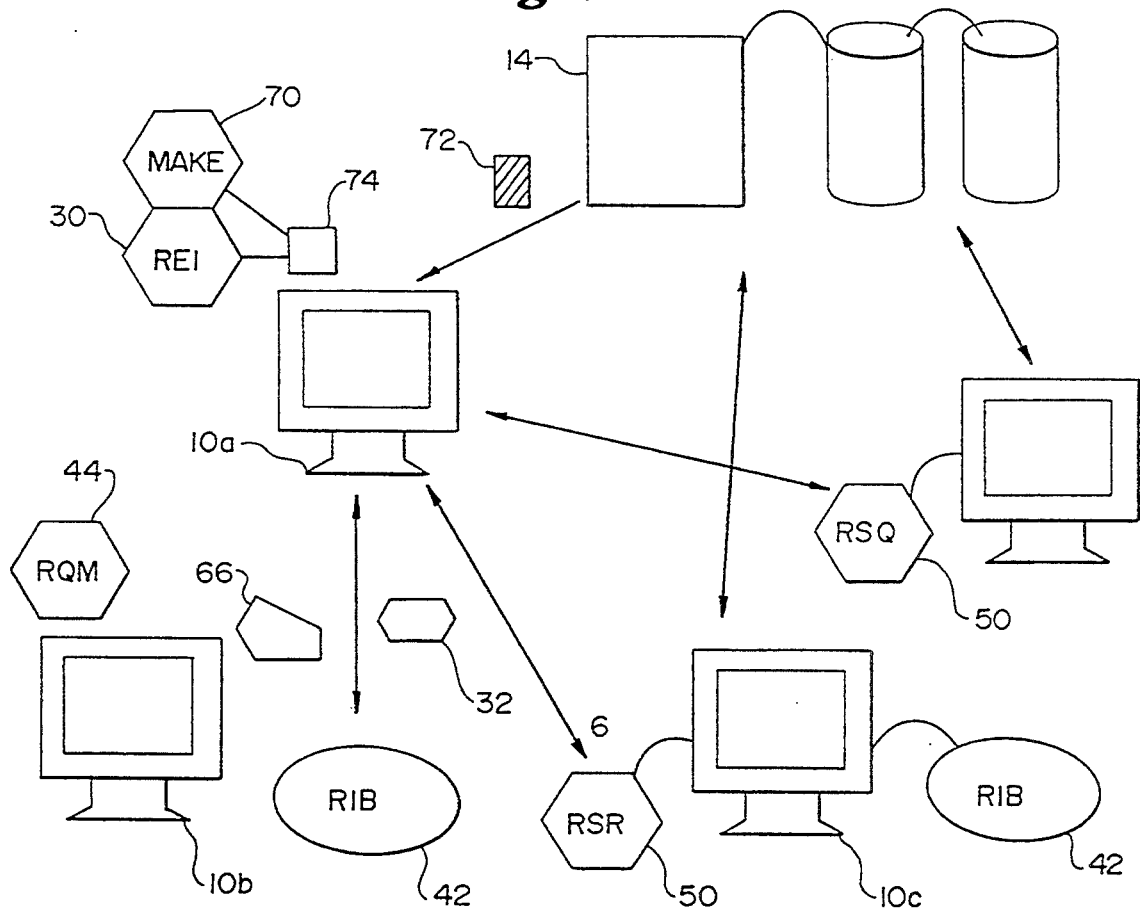
FIG. 9 is a schematic block diagram depicting the execution flow of a compiler application program utilizing the distributed remote execution services of the present invention.

Referring now to FIG. 9, the use of the present invention as a tool to support an application that performs a distributed compilation or distributed "make" will be described. Workstation 10a begins by executing a user program 20 that is a compiler program with the appropriate calls incorporated therein to the remote execution interface 30, the make program 70. In the preferred embodiment, the make program 70 is based on the Berkeley Standard Distribution (BSD TM) Release 4.3 of the make utility. The make program 70 reads a make file 72 from its reference file system. In this case the reference file system is not local to workstation 10a, but instead is located on file server 14. In the preferred embodiment, the make program 70 accepts standard SunOS TM, Unix ® System V, and BSD TM 4.3 make files. For more information about the standard features of the make utility, reference is made to Oram, A. and Talbott, S., *Managing Projects with make*, Prentice Hall, Englewood Cliffs, N.J. (1990).

The make file 72 contains a target, or software program, to build, and a description of the tasks and the sub-tasks which must be performed in order to accomplish the overall task of building that software program. The make file 72 contains a list of the dependencies among the tasks and sub-tasks for the files from which the target will be built. The make program 70 examines the descriptions of the task and sub-tasks in the make file 72 and creates a dependency graph 74 that specifies the dependencies among the sub-tasks and the order in which the sub-tasks must be performed. The make file 72 may contain a description of the type of workstations 10 or other processors that can be used to accomplish the specified task, and a list of rules, or commands for building each target. Using this information, the make program 70 assemblies a request query 32 to be sent to the RQM 44 via the remote execution interface 30. In the preferred embodiment if the user has not specified a set of user-specific parameters in the make file 72, the make program 70 requests processors 10 that have the same CPU architecture and the same operating system version as the originating processor 10a, and requests that those processors 10 be ordered in terms of lowest CPU load average.

In this example, weakly consistent copies of the RIB 42 reside on two separate workstations 10b and 10c; however, the request query 32 is directed to the copy of the RIB 42 residing on workstation 10b. The RQM 44 executing on workstation 10b receives the request query 32 and interrogates the RIB 42 to create a list of qualifying resources 66 in the manner described above. The make program 70 then receives the list of qualifying resources 66 and stores this list for use while performing the tasks in the make file 72.

When the make program 70 examines the dependency graph 74 and discovers a sub-task that is eligible for remote execution, the make program 70 selects the workstation 10 at the top of the list of qualifying resources 66 and creates a resource request 34 for that particular sub-task to be executed on the selected workstation, in this case workstation 10d. The resource request 34 will specify the reference file which the make program 70 is using, as well as any other data which describes the current environment of workstation 10a. The resource request 34 is sent across the network 12 to workstation 10d and the remote service routine 50 that is instantiated on that workstation forks a new remote control process 52 to begin performing the specified sub-task. When workstation 10d accepts the sub-task, it uses the information in the resource request 34 to set up an environment that is as close as possible to the environment on workstation 10a. This process can include accessing the reference file system, setting up system and user context information, accessing the indicated versions of any subordinate software programs, etc. Workstation 10d then proceeds to execute the sub-task. As soon as the specified sub-task has begun executing on workstation 10d, the make program 70 can again examine the dependency graph 74 and assign another workstation on the list of qualifying resources 66 to perform another subtask in parallel as long as that sub-task is not dependent on the sub-task executing on workstation 10d. In this case, a resource request 34 for a second sub-task is generated and sent to workstation 10c as selected from the list of qualifying resources 66.

Upon receipt of notification that a sub-task which is being executed remotely has completed, the make program 70 returns the name of that host workstation to the end of the list of qualifying resources 66 and continues to repeat the process of examining the dependency graph 74 and assigning workstations to perform the various sub-tasks available for executing until all of the sub-tasks have been completed. As part of this process, the make program 70 may notify the user of the progress of the each completed sub-task, for example, or may notify the user only in the event of any error or successful completion of the task. Communication between the remote service 23 running the task or sub-task and the make program 70 occurs in a selected one of the modes described above.

A more detailed description of how a user would invoke the make program 70 of the preferred embodiment using the netmake command is set forth as part of Appendix A in the man pages for NetMake TM. As those skilled in the art of Unix ® networks will appreciate, the man pages must contain all of the information necessary to enable a user to make use of the particular command.

Figure 10:
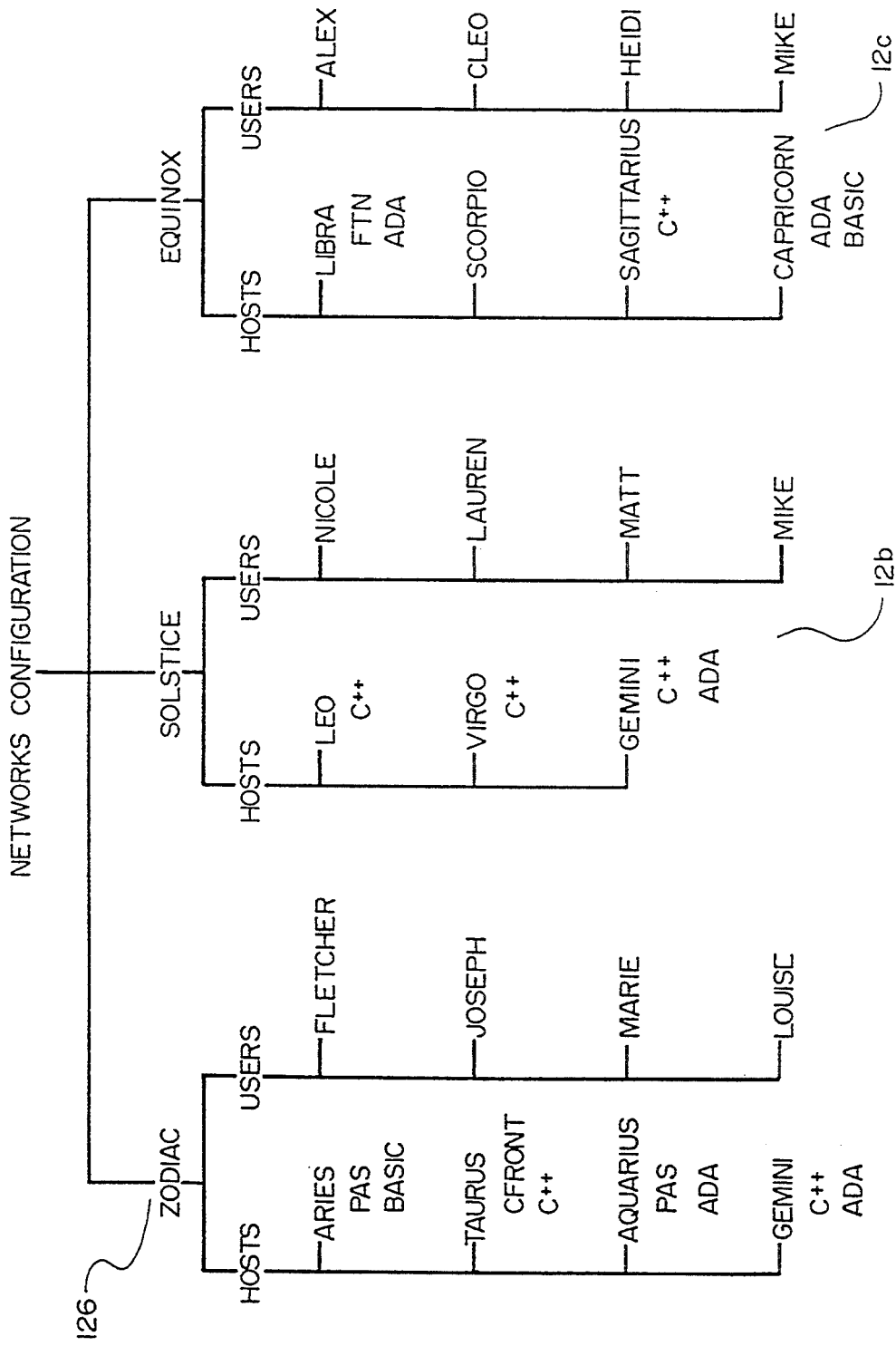
FIG. 10 is a schematic illustration of a sample heterogenous network environment on which the preferred embodiment of a distributed make program is to be installed.

Referring now to FIG. 10, the installation of the make program 70 on a sample network environment 12 that is divided in multiple zones, 12a, 12b and 12c, will be described. A network administrator will install the make program 70 on the network 12 by running an installation script to copy the software to an appropriate file on the network 12 with the network environment variable NW_HOME set by the system administrator to indicate the access path to the file containing the software for the make program 70. The network administrator then configures the hosts and users into the zones 12a, 12b, and 12c, as shown. The configuration of zones can be accomplished in any manner that makes sense for the particular network and its users. For example, the zones could be divided by specific workgroups, such as application development or simulation groups, or the zone could be divided in accordance with observed network traffic to improve overall network performance. In the sample shown in FIG. 10, ten hosts and eleven users are divided by workgroup. The users in the zodiac zone develop applications, while those in the solstice zone develop simulation software. It will be noted that the host gemini resides in both the zodiac and solstice zones, and that the user Mike is a member of both the solstice and equinox zones.

In the preferred embodiment, once the network administrator has determined how hosts and users should be organized, a network configuration tool, nwconfigu, is used to implement that organization. The configuration tool uses a graphical user interface to zones, to assist the administrator in defining a master host for the RIB 42, hosts within each zone, applications accessed by each host, and users in each zone. In the preferred embodiment, the graphical user interface is modeled after the Open Look TM GUI. Once the network is configured, the command nwstart is used to start the make program 70. Three daemon commands, rx—d, rib—d, and nw—hostmon—d, are used to start the remote execution interface 30, the resource management component 40 and the agents 48, respectively. The network administrator can monitor the status of the network and update the configuration using a number of other tools.

A more detailed description of all of the various commands and options available to the network administrator as part of the NetMake TM program and the NetWorks TM support package is set forth in the man pages of Appendix B.

APPENDIX A

Using NetMake

Using the NetMake Command

The following subsections summarize the information you need to use the NetMake command, including command syntax, options, and notes.

Syntax netmake [-D variable][-flags][-e][-f makefile . . . ][-I directory][-i][j Ma jobs][I-k][-1][-n][-q][-r][-s][-t][target . . . ][variable=value . . . ]

Options The NetMake command options are:

| | |
|---|---|
| -D variable | Define variable as value of 1 for entire makefile |
| -d flags | Turn on debugging and specify one or more flags to print debugging information about: |
| | A  All possible information |
| | a  Archive searching and caching |
| | c  Conditional evaluation |
| | d  Directory searching and caching |
| | g  Input dependency graph before making anything |
| | g2 Input dependency graph after making everything or before exiting on error |
| | j  Running multiple shells |
| | m  Making targets, including modification dates |
| | s  Suffix-transformation rules |
| | t  Target list maintenance |
| | v  Variable assignment |
| -e | Environment variables override assignments within makefile(s) |
| -f makefile | Use named description file rather than the default files makefile or Makefile |
| -I directory | Directory in which to search for makefiles; automatically includes system makefile directory |
| -i | Ignore error codes returned by commands in makefile |
| j Ma jobs | Maximum number of jobs that can run in parallel |
| -k | Continue processing after errors but only for targets not depending on target that caused error |

-continued

| | |
|---|---|
| -l | Run all commands locally rather than use remote execution |
| -n | No execution mode; display commands but do not execute |
| -q | Question mode; NetMake returns zero or non-zero status code depending on whether or not target file is current |
| -r | Do not read default makefile |
| -s | Silent mode; do not print command lines before execution |
| -t | Touch target files to bring them up-to-date rather than performing their rules |
| target | Perform specified step or build specified file |
| variable=value | Override any regular definition for specified variable |

Notes

By default, NetMake executes builds on hosts having the same CPU architecture, such as Sun-4, and operating system, such as Sans 4.1.1, as the originating host. Then, NetMake uses these hosts in order of CPU load average.

The g flag used with the debugging option (-flags) and the -n option produce the same produces results as the Sans -P option.

The t and v flags used with the debugging option (-flags) produce the same results as the Sans -p option.

Use the j rnax jobs option to specify the degree of "parallelism" you require. For example, use j 4 to execute the build across four hosts. NetMake would use four hosts if four hosts were needed and available.

Use the variable NW HOSTS to define a select statement that specifies a scheduling policy for NetMake to use when choosing hosts. You can define the variable in the makefile or as an environment variable. See the following subsection, Customizing the Makefile, for more information.

Use the variable NW LOCAL to specify commands for local execution. The default commands are r, echo, in, and touch, separated by a space. Use NW LOCAL for short commands or those that need interactive VO. NetMake ignores any path name used with the commands.

Use the variable NW MAX to specify the maximum number of hosts to run in parallel. NW MAX is identical to the j Ma jobs option, but the j option overrides the value of NW MAX.

If a remote host fails, NetMake generates an internal error and removes that host from the list of hosts available for remote processing for the remainder of that execution only.

Customizing the Makefile

You can customize your existing makefile to specify resource selection criteria and order of selection. The select statement accesses the resource information stored in the RIB.

Syntax NW HOSTS=select resource [if expression][[reverse] order by expression]

Options The available options are:

| | |
|---|---|
| if expression | Provides requirements that must be met to select the resource |
| reverse order by | Arranges information in descending order |
| order by | Arranges information in ascending order |

Network Resources There are two Network resources you can use in the select statement, APPL and UNIX HOST.

Use the APPL resource in the format APPL:NAME to select a host with a specified application.

These are properties for the UNIX HOST resource you use in the format UNIX HOST:XXXX, where X~X is the property:

| | |
|---|---|
| APPL ARCH | Application architecture identified by typing man arch to display kernel architecture and corresponding application architecture |
| CPU SYS | Percentage of time host has spent in By state, non-user state when executing within kernel; add to CPU USR time to determine total active CPU time |
| CPU IDL | Percentage of time host has spent in idle state |
| CPU USR | Percentage of time host has spent in user state; add to CPU SYS time to determine total active CPU time |
| HOST IDLE | Number of seconds host has been without active user |
| KERN ARCH | Kernel architecture type identified by typing untame-m or arch-k |
| LOAD 5 | Five minute load average |
| LOAD 10 | Ten minute load average |
| LOAD 15 | Fifteen minute load average |
| NAME | Host returned by untame -n command |
| OS TYPE | Operating system identified by typing untame -s |
| OS VERS | Operating system release identified by typing untame -r |
| VMEM FRE | Currently available swap space; add to VMEM RSV to determine total VMEM MAX |
| VMEM MAX | Maximum available swap space; total of VMEM FREandVMEM RSV |
| VMEM RSV | Currently used swap space; add to VMEM FRE to determine VMEM MAX |

Notes

An expression can be any mathematical or relational expression using binary operators with resource properties and numbers. Operators include $<, >, <=, >=, ==, !=, \&\&, 11, +, -, *\sqrt{}$.

For the first expression, use a constraint (Boolean or relational) that evaluates to true or false. For example:

select UNIX HOST:VMEM FRE<3000

For the second expression, use a numerical value that evaluates to a numerical that can then be ordered. For example:

select UNIX HOST:LOAD 5

You must put double quotation marks around string constants such as host name or architecture type. For example:

select UNIX HOST:APPL ARCH=="Bun"

You can build more complex expressions using parentheses. For example:

select(UNIX HOST:LOAD 5<.30)&&(UNIX HOST:VMEM FRE>3000)

To make sure there are no hidden dependencies, you should explicitly define all dependencies in the makefile. In this example, NetMake would build the two files in parallel:

target: tile tile

If tile is dependent on tile, you should specify:

target: tile tile: tile

To include nested makefiles, type:

.include "filename"

NetMake does not support the Sans syntax, include filename. NetMake does not support three Sans special targets, .KEEP STATE, .MAKE VERSION, and .SCSS GET. NetMake does not support parentheses syntax for libraries or .a rules.

To expand all variable references within the value before assigning that value to the variable, type:

variable := value

NetMake does not support the Sans syntax for conditional assignment, target := variable = value.

Examples:

To search for ANN hosts with a specific application and the lowest load average for the last five minutes, type:

NW HOSTS=select UNIX HOST if (APPL:NAME=="saber")order by UNIX HOST:LOAD 5

To search the RIB for all ANN hosts in the order in which they were entered into the RIB, type:

NW HOSTS=select UNIX HOST

To distribute the build to the Sun-4 hosts with the lowest load average for the last five minutes, type:

(NW HOSTS=select UNIX HOST if (UNIX HOST:APPL ARCH=="Bun") order by (UNIX HOST:LOAD 5)

To search for UNIX hosts because the expression (3*5==15) is true, type:

NW HOSTS=select UNIX HOST if 3*5==15

To search for a UNIX host named zodiac, type:

NW HOSTS=select UNIX HOST:HOST NAME=="zodiac"

To search for UNIX hosts with CPU that are idle greater than or equal to 30 percent of the time and display in ascending order, type:

NW HOSTS=select UNIX HOST if UNIX HOST:CPU IDL >=.30 order by UNIX HOST:CPU IDL

To search for UNIX hosts with a five minute load average of less than .40 and display in descending order by percentage of time host has spent in user state, type:

NW HOSTS=select UNIX HOST if UNIX HOST:LOAD 5<.40 reverse order by UNIX HOST:CPU USR

APPENDIX B

SYNOPSIS OF NetWorks Unix ® commands

NAME rxd—NetWorks Remote Execution server daemon

DESCRIPTION rxd is the server daemon for the remote execution system. It is usually started at boot time by rc.local or a similar file. It is an RPC server that must run as uid root. It calls rxc, the control process executable which sets up and actually runs the job. At present it has several options for the command line that can affect the behavior of rxd.

| | |
|---|---|
| -d<domain-ip> | - Turn on IP domain checking with this domain. |
| -m<ip-mask> | - Use this IP subnet mask for domain checking. |
| -z | - Turn on debugging messages. |
| -c | - Put messages on /dev/console. |

It will expect to find itself, rxc, and other NetWorks directories in the directory pointed to by the $NW HOME environment variable. Failing that it will default to hls local Networks. Within the NetWorks directory tree it maintains several files in var/rx.

FILES
<hosP.rxd.log-rxd log file, <host>.rxd.job-rxd job tracking file
SEE ALSO offioad(1NW), NetWorks (4NW)
NAME
qstat—about queues
SYNOPSIS
qstat[-a]-ABDFHLS queue-type
DESCRIPTION qstat displays information about queues within the Networks architecture as also allows control over them.

OPTIONS
a list all information about jobs
A activate a queue
B block a queue. Dispatch from the queue and insertion into the queue will not be permitted.
D disable a queue. Insertion into the queue will not be permitted.
F flush a queue. Remove all jobs from the queue.
H hold a queue. Dispatch from the queue will not be permitted.
L list a queue.
S print statistics for a given queue: the status of a given queue, number of queued jobs etc.
FILES
SEE ALSO, offload (1NW)

```
NAME
    nw_init()
SYNOPSIS
    #include <stdio.h>
    #include <sys/types.h>
    #include <sys/param.h>
    #include <NetWorks/nw.h>
    #include <NetWorks/nw procs.h>
    nw initttype, domain
    nw id type;
```

```
char *domain;
```

DESCRIPTION

This function initializes the NetWorks libraries and is the first function that all NetWorks clients should call. It takes two arguments: type and domain. "type" identifies the type of NetWorks client this is. The domain argument is a character string which identifies the domain of information in which this client will participate.
FILES
libnw.a
SEE ALSO
manage nw resource instance(3NW),
update nw resource_instance(3NW),
create_nw resource_instance(3NW),

```
NAME
    create_nw_res_instance(), free_nw_res_instance()
SYNOPSIS,
    #include <stdio.h>
    #include <sys/types.h>
    #include <NetWorks/nw.h>
    #include <NetWorks/nw procs.h>
    nw res instance
    create nw res instance(class name)
    char*class-name
    free nw res instance(res instance) nw res instance res instance;
```

DESCRIPTION

The procedure create nw resinstance() is used to create a resource instance of the class specified by class name. The argument class name must match the name of some resource which is defined in the NetWorks resource definition file and which has been published in the NetWorks NIS map. If class name is not valid then create nw resourceinstance() will return NULL. Otherwise, it returns a resource instance of the specified class type. Upon creation, the resource's properties values are unset, and the new instance is unknown to the Resource Information Base (RIB). The default location of the resource is the host upon which the instance was created. The property values can be set via calls to set nw property value() and the resources location can be set via a call to set res location(). Finally the new resource instance can be registered with the RIB via a call to manage child resource().

free nw resinstance() is used to free the memory associated with an instance of a nw resource and each of its children. This routine does not remove a resource from the RIB or in any way effect the resource's status if it has been managed by the RIB. Unregistering a resource instance can only be accomplished via a call to unmanage child resource().

FILES aciresdefs libnw.a
SEE ALSO set nw property value(3NW), get res location(3NW), manage child resource(3NW), aciresdefs(8NW)

```
NAME
    manage child res_instance(), unmanage_child_res_instance()
SYNOPSIS
    #include <stdio.h>
    #include <sys/types.h>
    #include <sys/param.h>
    #include <NetWorks/nw.h>
    #include <NetWorks/nw procs.h>
    #include <NetWorks/nw client.h>
    nwresult
```

```
manage_child_res_instance(parent, child 1, child 2, child 3, ..., child n, NULL)
nw_res_instance parent;
nw_res_instance child 1, child 2, child 3, ..., child n;
unmanage_child_res_instance(parent, child_1, child_2, child 3, ..., child n, NULL)
nw_res_instance parent; nw_res_instance child 1, child 2, child 3, ..., child n;
```

DESCRIPTION

The functions manage_child_res_instance() and unmanage child res_instance() register and unregister new resource instances with the Resource Information Base (RIB). Every resource instance in the RIB is contained within a domain. A domain represents the top level of a resource hierarchy. There may be several separate domains in the RIB, but each resource instance must be contained within exactly one domain. The user specifies their domain of interest, at initialization time with a call to nw init.

When a new resource instance is registered with the RIB it is simply inserted into the pre-specified domain, however, it can also be assigned as a child of a previously managed resource which will act as its parent. This type of hierarchy is useful for the creation of resource groups and classes which are composites of many resource classes. For example a user might define a unix host resource which is the parent of several other resources like disks, software licenses, queues, etc. The advantage of this is that allows whole groups of resources to be retrieved with a single call to request nw res instance() which is designed to retrieve group's parent resource instance. Each resource instance, however, may have at most one parent at any one time.

manage_child_res_instance() takes a variable length, NULL terminated argument list. The first argument is the resource instance which we want to act as a parent to the children. If no parent is desired this argument can be NULL. The remaining argument list must be a NULL terminated list of resource instances which are to be registered with the RIB and managed as children of the specified parent resource instance. This routine returns NW SUCCESS upon successful completion and a negative error code upon failure. As an example, the following two lines of code register a previously created instance of a unix host resource, place it in the default domain (specified by nw init), and make it the parent of several other previously obtained or created resource instances:

manage_child_res_instance(NULL, unix_host_instance, NULL); manage_child_res_instance(unix_host_instance, load_res_instance, file_sys_instance, NULL);

unmanage_child_res_instance() takes a variable length, NULL terminated argument list. The first argument is the resource instance which is currently as a parent of the children. The remaining arguments must be a NULL terminated list of resource instances which are to be unregistered from the RIB, and deleted as children of the specified parent resource. If NULL is specified as the parent resource instance, then the children are presumed to be unassociated with any parent and are simply removed from the domain. It should be noted that unmanaging a parent resource has the effect of unmanaging each of its children. For example, the following line of code will undo the effect of the previous two lines of code:

unmanage child res instance(NULL, unix_host_instance, NULL);

This function returns NW SUCCESS upon successful completion and a negative error code value upon failure.

FILES

SEE ALSO create nw resinstance(3NW), update_nw_resinstance(3NW), request_nw res_instance(3NW)

```
NAME
    update_nw_res_instance()
SYNOPSIS
    #include <stdio.h>
    #include <sys/types.h>
    #include <sys/param.h>
    #include <NetWorks/nw.h>
    #include <NetWorks/nw_procs.h>
    #include <NetWorks/nw_client.h>
    nw result
    update_nw_res_instance(res_instance)
    nw_res_instance_res instance;
```

DESCRIPTION update_nw_res_instance is used to commit the latest property value information about a previously created or requested resource instance and each of its managed children to the Resource Information Base (RIB). Typically this procedure is used in conjunction with set_nw_property_value() which changes the property values of resource instances, however, it is update_nw_res_instance(), not set_nw_property_value(), which makes the permanent change in the RIB. Performing an update nw_res_instance() on any resource instance causes an update_nw_res_instance to be performed on each of its managed children as well. This routine returns NW SUCCESS upon successful completion and a negative error code upon failure.

FILES libnw.a libnwclnt. a

SEE ALSO set_nw_property_value(3NW), get_nw_property_value(3NW), request_nw instance(3NW)

```
NAME
    select_first_instance(), select_next_instance(), select_prev_instance(),
    free_nw_res_instance list()
SYNOPSIS
    #include <stdio.h>
    #include <sys/types.h>
    #include <sys/param.h>
    #include <NetWorks/nw.h>
    #include <NetWorks/nw procs.h>
    nw_res_instance select_first_instance(instance list) nw_res_instance list instance list;
    nw resinstance select nextinstance(instance list) nw res instance list instance list;
    nw res instance select previnstance(instance list) nw res instance list instance list;
```

```
void free nw instance list(instance list) nw resinstance list instance list;
```

DESCRIPTION This set of four select functions is used to manipulate structures of the type nw_res_instance_list. An nw_res_instance_list is a structure which can contain an indefinite number of resource instances. Typically, an nw_resource_list would be obtained by querying the Resource Information Base (RIB) for existing resource instances or by a call to get_children() or get_classed_children().

select_first_instance() returns the very first resource instance which appears in its argument instance list. select_first instance() always rewinds a list to the beginning. If instance list is empty it returns NULL.

select_next_instance() returns the next resource instance which appears in its argument instance list. For example, calling select_next_instance() immediately after a call to select_first_instance() would return the second resource instance in the list. Calling it again returns the third instance. If the end of the list has been reached then this function returns NULL.

select_prev_instance() returns the previous resource instance which appears in its argument instance list. For example, calling select_prev_instance() immediately after calling select first instance() will return the first item in the list. Calling it again will return NULL since we've already reached the head of the list.

free nw_res_instance_list() is a utility function which is used to free all the memory associated with an nw_res_instance list, and its contents. This function has no return value.

FILES libnw.a
SEE ALSO request_nw_resource_instances(3NW), get_children(3NW), free_nw resource_instance(3NW)

requested property. Each property's type is defined in the aciresdefs file. This function takes two arguments; the resource instance of interest and the name of the property for which we want the value. If the defined type of the requested property is NW FLOAT or NW DOUBLE then the type returned by get_nw_property_value will be (nw_float *) or (nw_double *) respectively. If the property name specified does not match the name of a defined property of the specified resource, then NW STATUS is set to indicate a failure case and the result returned is NULL.

The function set_nw_property_value() is used to set a property value of a resource instance. It takes three arguments; a resource instance, the name of the property to be set and the new value of the specified property. The type of the value argument must match the type which was defined for the property specified by the argument prop name. Each property's type is defined in the aciresdefs file. If the defined type of the requested property is NW FLOAT or NW DOUBLE then the value provided should be of type (nw_float *) or (nw_double *) respectively. If the property name specified does not match the name of a defined property of the specified resource, then NW STATUS is set to indicate a failure case and the result returned will likewise indicate the failure condition. It is important to note that this procedure by itself will not effect the value of the specified resource and its properties as far as the RIB is concerned. Rather the changes made to the resources must be committed to the RIB with a call to update_nw_res_instance().

FILES libnw.a aciresdefs
SEE ALSO update_nw_res_instance(3NW)

```
NAME
    get children(), get classed children()
SYNOPSIS
    #include <stdio.h>
    #include <sys/types.h>
    #include <NetWorks/nw.h>
    #include <NetWorks/nw_procs.h>
    nw_res_instance_list get_children(parent) nw_res_instance parent;
    nw res instance get_classed_children(parent, class_name) nw_res_instance
    parent;
    char *class_name;
```

```
NAME
    get_nw_property_value()set_nw_property_value()
    #include <stdio.lv
    #include <sys/types.lvl
    #include <Networks/nw.h>
    #include <NetWorks/nw_procs.h>
    caddr t
    get_nw_property_value(resource, prop_name)
    nw_res_instance resource;
    char *prop name;
    nw result
    set_nw_property_value(resource, prop_name, (caddr t) value)
    nw_res_instance resource;
    char *prop name;
    caddr_t value;
```

DESCRIPTION

The function get_nw_property_value() is used to interrogate a resource instance for the value of its properties. The result must be cast to the defined type of the

DESCRIPTION

The function get_children() is used to retrieve the immediate children of the specified resource instance. The result is a list of type nw_res_instance_list which can be manipulated with functions select_first_instance(), select_next_instance() and select_prev_instance() to retrieve individual the children.

The function get_classed_children() is used to retrieve the immediate children of a specified resource instance with the stipulation that the children be of particular resource class. It takes two arguments, a resource instance and a valid resource class name. The result of this function is an nw_res_instance_list which contains resources instances which are children (or grandchildren, etc) of the parent. The list can be manipulated with the functions select_first_instance(), select_next_instance() and select_prev_instance() to retrieve individual the children. Both this function and get_children() return NULL if no children are found.
FILES libnw.a
SEE ALSO request_nw_res_instance(3NW), manage_child_res_instance(3NW), select_next_instance(3NW)

```
NAME
    get_res_location(), set_res_location()
SYNOPSIS
    #include <stdio.h>
    #include <sys/types.h>
    #include <NetWorks/nw.h>
    #include <NetWorks/nw_procs.h>
    char *
    get_res_location(res instance)
    nw_res_instance res_instance;
    nw_result
    set_res_location(res_instance, host_name)
    nw_res_instance res_instance;
    char *host_name;
```

DESCRIPTION

The function get_res_location() is used to retrieve the name of the host where the specified resource instance is found. It takes as its argument a valid resource instance and it returns a pointer to a character string containing a hostname. It should be noted that the returned pointer points to static memory which will be overwritten by subsequent calls to get_res_location(). The default location of every resource instance is the host where the instance was created with a call to create_nw_res_instance().

The procedure set_res_location() is used to specify the name of the host where the specified resource instance is found. If res_instance is NULL, or host_name isn't the name of a known host then set_res_location() returns NW_FAILURE. Otherwise the location of res_instance is changed and set_res location() returns NW_SUCCESS.

FILES libnw.a
SEE ALSO create_nw_res_instance(3NW), update_nw_res_instance(3NW)

```
NAME
    set_nw_property_value(), get_nw_property_value()
SYNOPSIS
    #include <stdio.h>
    #include <sys/types.h>
    #include<NetWorks/.nw.h>
    nw_id
    set_nw_property__value(res_instance, prop_name, prop_val)
    nw_res_instance res_instance;
    char *prop_name;
    caddr_t prop_val;
    caddr_t
    get_nw property_value(res_instance, prop_name)
    nw_res_instance res_instance;
    char *prop_name;
```

DESCRIPTION

The procedure set_nw_property_value() is used to set the property values of a resource instance. The first argument, "res_instance" must be a valid resource instance which was obtained by a previous call to create_nw_resource_instance(3), request_nw_resource_instance(3) or some other valid method of getting a resource instance. The second argument "prop_name" is a character string identifying the name of the requested property. If prop_name is not valid, i.e. it does not match the name of a property belonging to the same resource class as res_instance, then get_nw_property_value(), will return NW_FAILURE. The third argument, "prop_val" is the value that we wish to associate with the specified property. Valid types of values are: int, long, unsigned long, float *, double *, char, char *. Because of system level dependencies set_nw_property_value() may work incorrectly if passed a value of type float or double. Upon successful completion set_nw_property_value returns NW_SUCCESS and NW_FAILURE upon failure.

The procedure get_nw_property_value() is used to retrieve the value associated with a specified property of a resource instance. Its first argument is a valid resource instance which was obtained by a previous call to create_nw_resource_instance(3), request_nw_resource_instance(3) or some other valid method of getting a resource instance. The second argument "prop_name" is a character string identifying the name of the requested property. If prop_name is not valid the get_nw_property_value() returns NULL. This is a potential problem area since it is possible that NULL could be interpreted as a valid return value. Otherwise get_nw_property_value() returns the value associated with the specified property. The user is expected to cast the return value appropriately. Potential return types are: int, long, unsigned long, char, float *, double *, char *.

FILES libnw.a aciresdefs
SEE ALSO create_nw_resource_instance(3), request_nw_resource_instance(3), update_nw_resource(3), aciresdefs(8)

NetWorks Unix ® Process control clones

```
rx_kill()
    nw_result rx_kill(
        nw_pid *nietproc,
```

This function is essentially identical to the Unix kill() function. Any signal value will be accepted although not all make sense. This function simply has the remote server call kill() locally to signal the appropriate process.

Return value

A value of 0 indicates that the kill() function was successful and the remote process did get the signal. A value of −1 indicates some other problem and the remote process may or may not have gotten the signal. This matches Unix kill() behavior.

```
rx_wait() et. al
nw_result rx_wait(
    nw_int      *statusp    /* storage for return status   */
nw_result rx_waitpid(
    nw_pid      *nw_pid,    /* id of remote process*/
    nw_int      *statusp,   /* storage for return status   */
    nw_int      options     /* options for wait call */
nw_result rx_wait3(
    nw_int      *statusp,   /* storage for return status   */
    nw_int      options,    /* options for wait call */
    struct rusage  *rusage  /* resource usage info */
nw_result rx_wait4(
    nw_pid      *nw_pid,    /* id of remote process        */
    nw_int      *statusp,   /* storage for return status   */
    nw_int      options,    /* options for wait call */
    struct rusage  *rusage  /* resource usage info */
```

All of the rx_waitXXX() calls generally behave exactly like their counterparts. In the place of the normal Unix process ID, the nw_pid is used. Most of these calls will block under normal circumstances, although some cases won't block. Any case that would block (and some non-blocking cases that might take a long time to process) will result in the remote execution server fork()ing a copy of itself to execute the wait() call. These processes will be cleaned up automatically under normal circumstances. The rx terminate() and rx cleanup() calls will also clean these up if possible.

The standard wait macros (WIFSTOPPED(), WIFSIGNALED(), etc) can be used on the status value returned since it follows normal Unix conventions.

Note that a normal wait() call can last a long time, much longer than normal RPC timeouts. So in implementation the local side waits in a select(). This allows a timeout, which can be set with rx set timeout().

Return value

One difference is that these calls may return because of errors that have nothing to do with the wait() call, such as an RPC timeout, server problem, etc. In these cases the call will return a 0 (normally waitXXX() calls return a −1 or a process id), and the rx__errno and errno can be checked for more info.

NetWorks Process control functions

---
rx__detach()
nw__int rx__detach(nw pid *netproc);
---

This function will attempt to turn an attached process into a detached one. It will remove any parent/child relationship, etc.

Return values NW__SUCCESS means the process has been detached. At that point only rx__terminate(), rx__status(), or rx__reattach() can be used on it. NW__FAIL means either the process is still attached (E~X INTERACTIVE processes cannot be detached) or the nw__pid is invalid.

---
rx__reattach()
nw__pid rx__reattach(nw pid *netproc
---

This function will attempt to reattach to a detached process and establish a client/child relationship. Return values It will fail and return NW__FAIL if unsuccessful, and a pointer to the nw__pid passed in if successful. A process that is already attached cannot be reattached somewhere else and will cause an error. The security/authentication here is identical to rx__terminate().

---
rx__cleanup()
nw__int rx__cleanup(nw pid *netproc),
---

A remote child that has finished execution may still be gobbling some resources on either the client or server side, primarily in tracking status, supporting wait() calls, etc. This call will cleanup any resources, close() sockets, etc. If this call returns successfully then remote process will not be tracked as a child any more. Once this is called for a remote process, it is no longer included in the children or able to be used with any process control functions. The function will fail if called on a non-attached process or an attached one that is still running.

Return value

NW__SUCCESS indicates that the process was cleaned up. NW__FAIL may mean the process isn't known to the server or the server was unreachable.

---
rx__terminate()
nw__int rx__terminate(nw__pid *netproc
---

This function will terminate the process netproc with extreme prejudice. First it will try sending a SIGTERM to the process so it has a chance to clean up. If that fails, then SIGKILL will be tried. After the process terminates any necessary cleanup will be done like close()ing sockets for RX__INTERACTIVE processes. The userid of the caller must match the process to be terminated.

This function cleans up the process completely like rx__cleanup(). If you want to kill a remote process, but still have it tracked for status and wait() functions, use rx__kill(someproc, SIGTERM) instead.

This function is special in that it is the only process control function that can be used on an RX__DETACHED (batch) process. This allows a kill like command that will work for all remote processes.

Return values

If the remote process doesn't terminate or isn't known. NW FATT.

NetWorks General Support routines

---
rx__exit()
bool__t rx__exit();
---

This function cleans up the RX client side library. It should be called before a client exits, but isn't mandatory.

Return values

At present rx__exit() always returns NW__SUCCESS.

---
rx__init__client()
bool__t__rx__init__client();
---

This function initializes the RX client side library. It *must* be called before the RX client lib functions can be used.

Return values NW__SUCCESS is returned if initialization was okay. NW__FAILURE indicates some problem, most likely memory or lack of a server deamon on the local machine.

---
rx__make__pid()
nw__pid *rx__make__pid(char *hostname, nw__int id
---

This function will convert an ASCII host name and id into a nw__pid. If the hostname is of the form like luna:123, it will be parsed directly and the id value will be ignored.

Return values A pointer to a static nw__pid struct that is rewritten every call. For a simple status client for example, you could get the status of a job/process without messy intermediate holders like this: rx init client(); foostatus=rx get status (rx make pid(argv[1], atoi-(argv[2]));

```
rx_print_pid()
char *rx_print_pid(nw_pid *pid
```

This function will print a pid into a swing in a form like luna:O00123. The leading O's are provided for the sake of the Queue Manager and other things that are accessing the RIB. They are not required by the remote execution API or daemons.

Return values

A pointer to a string that is rewritten every call. You must strcpy() out of it to keep the value past the next call.

```
rx_get_runhost()
char *rx_get_runhost nw_pid *netproc);
```

Get the name of the host that netproc is executing on.
Return value
A pointer to a recycled static string (ala.rx_print_pid()) of the host that is running or ran the job. NULL means the job

```
rx_get_status()
rx_-stat*rx_get_status(
    nw_pid  *netproc
);
```

The simple status of a process is returned. This function may be called by anyone on any remote process as long as the nw_pid is valid.

Note this function is the only way to get status on a detached process.

Return value A pointer to a static rx_stat struct is returned. This struct is rewritten with every call. NW_FAIL is returned on error. The status member will have one of the following values.

| | |
|---|---|
| RX_QUEUED | -The job is queued, but not yet executing. |
| RX_SUBMITTED | -The job is being setup for actual execution. |
| RX_RUNNING | -The process is currently executing. |
| RX_DONE | -The process is completed and exited. |
| RX_TERMINATED | -The process terminated on a signal. |
| RX_UNKNOWN | -The process didn't exist in the current log period. |

Note there are many more status that are used internally by the server and RIB. These won't be seen in the RIB, but may be seen transiently if querying the server directly.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. An integrated system for providing resource management and distributed remote execution services in a heterogenous computer network environment having a plurality of resources loosely coupled to each other in the network environment, the resources including at least two or more computer processors executing different operating system programs, each different operating system program having a set of kernel programs unique to that operating system program and a unique file space, and any memory devices and subordinate programs operating together with the computer processors, at least some of the resources being available to perform remote execution services, the integrated system comprising:

a plurality of interface means, each of the plurality of interface means operably integrated with a unique one of a plurality of requestors in the network environment without requiring the set of kernel programs of the operating system program associated with that requester to be modified and recompiled, each of the plurality of interface means for issuing both a resource query and a resource request for a remote execution service, the resource query including one or more query parameters specifying a set of resources that can satisfy the resource request, the resource request including information necessary to perform the remote execution service;

database means operably connected to the network environment for storing one or more items of information about the resources in the network environment, the items of information stored in the database means being available to the plurality of requestors in the network environment and including one or more items of dynamic information;

agent means operating on at least one of the computer processors for periodically collecting across more than one file space the one or more items of dynamic information about one or more computer processor and any other resources operating together with the computer processors that are available to perform remote execution services and providing the items of information to the database means;

resource query means operably associated with the database means for receiving a resource query for a remote execution service from any one of the plurality of interface means, analyzing the database means to determine which of the resources in the network environment match the query parameters and are available to satisfy the resource request, and returning to the interface means a list of resources which can be used to satisfy the resource request; and a remote execution service means operating on each of the computer processors that is available to perform remote execution services without requiring the set of kernel programs of the operating system program associated with that requester to be modified and recompiled, each remote execution service means for receiving the resource request for the remote execution service from the interface means, performing the remote execution service and returning any results from the remote execution service to the interface means, such that one or more computer processors are chosen by the requestor as the resources to which to send the resource request in order to perform the remote execution services based upon the list of resources provided by the resource query means.

2. The integrated system of claim 1 wherein the query parameters include:

a set of resource requirements for the resource request; and a scheduling policy for determining how the list of resources should be ordered by the resource query means.

3. The integrated system of claim 1 wherein multiple resource requests are sent to one or more computer processors using the list of resources generated in response to a single resource query.

4. The integrated system of claim 1 where the computer processors selected as the resources to perform the remote execution service are determined automatically by the interface means using a predetermined criteria.

5. The integrated system of claim 1 wherein the requestor in the network is an application program executing on one of the computer processors and wherein the computer processors selected as the resources to perform the remote execution service are determined by the application program.

6. The integrated system of claim 1 wherein the items of information about the resources are stored as one or more property-value pairs for each resource and wherein the integrated system further comprises:

resource definition database means operably connected to the database means and the resource query means for storing a strongly typed value for each property defined for a resource that together comprise the property-value pair for that property for that resource.

7. The integrated system of claim 1 wherein the remote execution service means includes:

first means executing on the computer processor for receiving the resource requests from the interface means and monitoring the status of the resource requests; and second means operably initiated by the first means for each resource request for performing the remote execution service in response to the resource request.

8. The integrated system of claim 7 wherein the second means is capable of responding to and initiating one or more control directives between the second means and the interface means.

9. The integrated system of claim 8 further comprising:

third means capable of performing interactive input/output between the interface means and the remote execution service.

10. The integrated system of claim 1 wherein the operating system programs are different versions of Unix-based operating system programs.

11. A system for managing requests for remote execution services in a heterogenous computer network environment having a plurality of resources loosely coupled to each other in the network environment, the resources including at least two or more computer processors executing different operating system programs, each different operating system program having a set of kernel programs unique to that operating system program and a unique file space, and any memory devices and subordinate programs operating together with the computer processors, at least some of the resources being available to perform remote execution services, the system comprising:

a plurality of interface means, each of the plurality of interface means operably integrated with a unique one of a plurality of requestors in the network environment without requiring the set of kernel programs of the operating system program associated with that requester to be modified and recompiled, each of the plurality of interface means for issuing a resource query for a remote execution service, the resource query including one or more query parameters specifying a set of resources that can satisfy the resource request, the query parameters including:

a set of resource requirements for the resource request; and a scheduling policy for determining how the list of resources should be ordered;

database means operably connected to the network environment for storing one or more items of information about the resources in the network environment, the items of information stored in the database means being available to the plurality of requestors in the network environment;

agent means operating on at least one of the computer processors for periodically collecting across more than one file space the one or more items of dynamic information about one or more computer processor and any other resources operating together with the computer processors that are available to perform remote execution services and providing the items of information to the database means; and resource query means operably associated with the database means for receiving a resource query for a remote execution service from any one of the plurality of interface means, analyzing the database means to determine which of the resources in the network environment match the query parameters and are available to satisfy the resource request, and returning to the interface means a list of resources which can be used to satisfy the resource request in an order specified by the scheduling policy, such that one or more computer processors are selected by the requestor as the resources to which to send the resource request in order to perform the remote execution services based upon the list of resources provided by the resource query means.

12. The system of claim 11 where the computer processors selected as the resources to perform the remote execution service are determined automatically by the interface means using a predetermined criteria.

13. The system of claim 11 wherein the requestor in the network is an application program executing on one of the computer processors and wherein the computer processors selected as the resources to perform the remote execution service are determined by the application program.

14. The system of claim 11 wherein the items of information about the resources are stored as one or more property-value pairs for each resource and wherein the integrated system further comprises:

resource definition database means operably connected to the database means and the resource query means for storing a strongly typed value for each property defined for a resource that together comprise the property-value pair for that property for that resource.

15. A system for servicing distributed remote execution requests in a heterogenous computer network environment having a plurality of resources loosely coupled to each other in the network environment, the resources including at least two or more types of computer processors, each different operating system program having a set of kernel programs unique to that operating system program and a unique file space, and any memory devices and subordinate programs operating together with the computer processors, at least some of the resources being available to perform remote execution services in response to the remote execution requests, the integrated system comprising:

a plurality of interface means, each of the plurality of interface means operably integrated with a unique one of a plurality of requestors in the network environment without requiring the set of kernel programs of the operating system program associated with that requester to be modified and recompiled, each of the plurality of interface means for issuing a resource request for a remote execution service, the resource request including information necessary to perform the remote execution service; and a remote execution service means operating on each of the computer processors that is available to perform remote execution services without modifying the operating system program associated with that computer processor, each remote execution service means for receiving a resource request for a remote execution service from one or more of the plurality of interface means, performing the remote execution service and returning any results from the remote execution service to the interface means, the remote execution service means including:

first means executing on the computer processor for receiving the resource requests from the interface means and monitoring the status of the resource requests; and second means operably initiated by the first means for each resource request for performing the remote execution service in response to the resource request.

16. The system of claim 15 wherein the second means is capable of responding to and initiating one or more control directives between the second means and the interface means.

17. The system of claim 16 further comprising:

third means capable of performing interactive input/output between the interface means and the remote execution service.

18. An integrated method for providing resource management and distributed remote execution services in a heterogenous computer network environment having a plurality of resources loosely coupled to each other in the network environment, the resources including at least two or more computer processors executing different operating system programs, each different operating system program having a set of kernel programs unique to that operating system program and a unique file space, and any memory devices and subordinate programs operating together with the computer processors, at least some of the resources being available to perform remote execution services, the method comprising the steps of:

(a) for each of the computer processors that is available to perform remote execution services, performing the steps of:

(a1) periodically collecting one or more items of information about that computer processor and the other resources operating together with that computer processors, and (a2) periodically providing the items of information to a resource information database operably connected to the network environment for storing the items of information about the resources in the network environment;

(b) for each of a plurality of requestors in the network environment that can utilize a remote execution service, using a remote execution interface that is separate from the operating system program associated with the requestor and does not require the kernel programs of the operating system to be modified and recompiled to perform the steps of:

(b1) issuing a resource query for a remote execution service, the resource query including one or more query parameters specifying a set of resources that can satisfy the resource request, and (b2) issuing a resource request for the remote execution service to one or more selected computer processors, the resource request including information necessary to perform the remote execution service;

(c) in a computer processor operably associated with the resource information database, performing the steps of:

(c1) receiving a resource query for a remote execution service from an application program from any of the plurality of requestors, (c2) analyzing the database to determine which of the resources in the network environment match the query parameters and are available to satisfy the resource request, and (c3) returning to the remote execution interface a list of available resources which can be used to satisfy the resource request; and (d) for each of the selected computer processors that is to perform the remote execution service, using a remote execution service that is separate from the operating system program associated with the resource and does not require the kernel programs of the operating system to be modified and recompiled to perform the steps of:

(d1) receiving the resource request for the remote execution service from the remote execution interface, (d2) performing the remote execution service, and (d3) returning any results from the remote execution service to the remote execution interface, such that one or more selected computer processors are chosen by the requestor as the resources to which to send the resource request in order to perform the remote execution services based upon the list of resources generated by analyzing the resource information database.

19. The integrated method of claim 18 wherein the query parameters include:

a set of resource requirements for the resource request; and a scheduling policy for determining how the list of resources should be ordered by the resource query means.

20. The integrated method of claim 18 wherein multiple resource requests are sent to one or more computer processors using the list of resources generated in response to a single resource query.

21. The integrated method of claim 18 where the selected computer processors are determined automatically by the remote execution interface using a predetermined criteria.

22. The integrated method of claim 18 wherein the requestor in the network is an application program executing on one of the computer processors and wherein the selected computer processors selected are determined by the application program.

23. The integrated method of claim 18 wherein the items of information about the resources are stored as one or more property-value pairs for each resource in a resource definition database associated with the resource information database.

24. The integrated method of claim 18 wherein step (d) is accomplished by the steps of:
   executing a first program on the selected computer processor to receive the resource requests from the remote execution interface and monitor the status of the resource requests; and
   executing a second program for each resource request that is initiated by the first program to perform the remote service in response to the resource request.

25. The integrated method of claim 18 wherein the second program is capable of responding and initiating one or more control directives between the selected computer processor and the remote execution interface.

26. The integrated method of claim 18 wherein step (d) further comprises the step of:
   executing a third program for a selected resource request that is initiated by the first program to perform interactive input/output between the selected computer processor and the remote execution interface.

27. The integrated method of claim 18 wherein the operating system programs are different versions of Unix-based operating system programs.

28. A method for managing distributed remote execution services in a heterogenous computer network environment having a plurality of resources loosely coupled to each other in the network environment, the resources including at least two or more computer processors executing different operating system programs, each different operating system program having a set of kernel programs unique to that operating system program and a unique file space, and any memory devices and subordinate programs operating together with the computer processors, at least some of the resources being available to perform remote execution services, the method comprising the steps of:
   (a) for each of the computer processors that is available to perform remote execution services, performing the steps of:
      (a1) periodically collecting one or more items of dynamic information about that computer processor and the other resources operating together with that computer processors, and
      (a2) periodically providing the items of dynamic information to a resource information database operably connected to the network environment for storing the items of information about the resources in the network environment from more than one file space;
   (b) for each of a plurality of requestors in the network environment that can utilize a remote execution service, issuing a resource query for a remote execution service, the resource query including one or more query parameters specifying a set of resources that can satisfy the resource request, the query parameters including:
      a set of resource requirements for the resource request; and
      a scheduling policy for determining how the list of resources should be ordered;
   (c) in a computer processor operably associated with the resource information database, performing the steps of:
      (c1) receiving a resource query for a remote execution service from an application program from any of the plurality of requestors,
      (c2) analyzing the database to determine which of the resources in the network environment match the query parameters and are available to satisfy the resource request, and
      (c3) returning to the remote execution interface a list of available resources which can be used to satisfy the resource request in an order specified by the scheduling policy,
   such that one or more selected computer processors are chosen by the requestor as the resources to which to send the resource request in order to perform the remote execution services based upon the list of resources generated by analyzing the resource information database.

29. The method of claim 28 wherein multiple resource requests are sent to one or more computer processors using the list of resources generated in response to a single resource query.

30. The method of claim 28 where the selected computer processors are determined automatically by the remote execution interface using a predetermined criteria.

31. The method of claim 28 wherein the requestor in the network is an application program executing on one of the computer processors and wherein the selected computer processors selected are determined by the application program.

32. The method of claim 28 wherein the items of information about the resources are stored as one or more property-value pairs for each resource in a resource definition database associated with the resource information database.

33. A method for servicing distributed remote execution requests in a heterogenous computer network environment having a plurality of resources loosely coupled to each other in the network environment, the resources including at least two or more computer processors executing different operating system programs, each different operating system program having a set of kernel programs unique to that operating system program and a unique file space, and any memory devices and subordinate programs operating together with the computer processors, at least some of the resources being available to perform remote execution services in response to the remote execution requests, the method comprising the steps of:
   (a) for each of a plurality of requestors in the network environment comprised of an application program executing on one of the computer processors that can utilize a remote execution service, using a remote execution interface that is separate from, but compiled with, the application program to issue a resource request for the remote execution service to one or more selected computer processors, the resource request including information necessary to perform the remote execution service; and
   (b) for each of the selected computer processors that is to perform the remote execution service, executing a first program on the selected computer processor separate from the operating system program and does not require the kernel programs of the operating system to be modified and recompiled for that computer processor to control communication with the remote execution interface that has sent the resource request to perform the steps of:
  (b1) receiving the resource request for the remote execution service from the remote execution interface, and
  (b2) monitoring the status of the remote execution service; and
(c) for each of the selected computer processors that is to perform the remote execution service, executing a second program separate from the operating system program and does not require the kernel programs of the operating system to be modified and recompiled for that computer processor that is initiated by the first program to perform the remote execution service in response to the resource request and return any results to the remote execution interface.

34. The method of claim 33 wherein the second program is capable of responding and initiating one or more control directives between the selected computer processor and the remote execution interface.

35. The method of claim 33 further comprises the step of:
  (d) executing a third program for a selected resource request that is initiated by the first program to perform interactive input/output between the selected computer processor and the remote execution interface.

36. The system of claim 1 wherein the remote execution service means includes means for instantiating the remote execution service if necessary prior to performing the remote execution service.

37. The system of claim 15 wherein the remote execution service means includes means for instantiating the remote execution service if necessary prior to performing the remote execution service.

38. The method of claim 18 further comprising the step of:
  (d1a) instantiating the remote execution service if necessary prior to performing the remote execution service.

* * * * *